United States Patent
Kirchhoff et al.

(10) Patent No.: US 9,512,240 B2
(45) Date of Patent: *Dec. 6, 2016

(54) PROCESS FOR THE PRODUCTION OF WATER AND SOLVENT-FREE POLYMERS

(75) Inventors: Jörg Kirchhoff, Köln (DE); Werner Bäcker, Wipperfürth (DE); Rolf Feller, Mettmann (DE); Paul Wagner, Düsseldorf (DE); John Lovegrove, Sarnia (CA); Hanns-Ingolf Paul, Leverkusen (DE)

(73) Assignee: LANXESS INTERNATIONAL SA, Granges-Paccot (CH)

( * ) Notice: Subject to any disclaimer, the term of this patent is extended or adjusted under 35 U.S.C. 154(b) by 718 days.

This patent is subject to a terminal disclaimer.

(21) Appl. No.: 13/063,227

(22) PCT Filed: Sep. 17, 2009

(86) PCT No.: PCT/EP2009/062073
§ 371 (c)(1),
(2), (4) Date: Nov. 3, 2011

(87) PCT Pub. No.: WO2010/031823
PCT Pub. Date: Mar. 25, 2010

(65) Prior Publication Data
US 2012/0043687 A1    Feb. 23, 2012

(30) Foreign Application Priority Data
Sep. 19, 2008  (EP) .................... 08105393

(51) Int. Cl.
*B29C 47/76*  (2006.01)
*C08C 2/00*   (2006.01)
(Continued)

(52) U.S. Cl.
CPC ............... *C08C 2/00* (2013.01); *B29B 7/7485* (2013.01); *B29C 47/364* (2013.01); *B29C 47/38* (2013.01);
(Continued)

(58) Field of Classification Search
CPC ...................................................... B29C 47/76
USPC ............................................................ 425/86
See application file for complete search history.

(56) References Cited

U.S. PATENT DOCUMENTS 2,833,750 A *  5/1958  Vickers ................. 528/481
3,117,953 A    1/1964  Goebel et al.
(Continued)

FOREIGN PATENT DOCUMENTS

DE   3315803     10/1984
DE   19537113    3/1997
(Continued)

OTHER PUBLICATIONS

International Search Report from co-pending Application PCT/EP09062073 dated Nov. 26, 2009, 3 pages.
(Continued)

*Primary Examiner* — Christina Johnson
*Assistant Examiner* — Xue Liu

(57) ABSTRACT

The present invention relates to water and solvent-free polymers, in particular water and solvent-free synthetic rubber products like non-halogenated and halogenated butyl rubber products as well as a process for the production thereof. The invention further relates to a device suitable to accomplish said process.

24 Claims, 11 Drawing Sheets

(51) Int. Cl.
    *C01B 5/00* (2006.01)
    *C08F 6/00* (2006.01)
    *B29C 47/36* (2006.01)
    *B29C 47/38* (2006.01)
    *B29C 47/60* (2006.01)
    *B29C 47/62* (2006.01)
    *B29B 7/74* (2006.01)

(52) U.S. Cl.
    CPC ........... *B29C 47/6056* (2013.01); *B29C 47/62* (2013.01); *C01B 5/00* (2013.01); *C08F 6/003* (2013.01)

(56) References Cited

U.S. PATENT DOCUMENTS

| | | | |
|---|---|---|---|
| 3,963,558 A | | 6/1976 | Skidmore |
| 4,055,001 A | | 10/1977 | Forster et al. |
| 4,686,279 A | * | 8/1987 | Nagtzaam et al. ............ 528/501 |
| 4,808,262 A | | 2/1989 | Aneja et al. |
| 5,283,021 A | | 2/1994 | Shih |
| 5,684,087 A | * | 11/1997 | Wulff et al. .................... 525/63 |
| 6,187,962 B1 | | 2/2001 | Arnoldy et al. |
| 6,811,294 B1 | | 11/2004 | Elsner et al. |
| 2001/0056176 A1 | | 12/2001 | Takami et al. |
| 2005/0049394 A1 | | 3/2005 | Dong et al. |
| 2005/0267288 A1 | | 12/2005 | Yamaguchi et al. |
| 2008/0242828 A1 | | 10/2008 | Kunishi et al. |

FOREIGN PATENT DOCUMENTS

| | | |
|---|---|---|
| EP | 0102122 | 3/1984 |
| EP | 0922691 A1 | 6/1999 |
| EP | 1127609 | 8/2001 |
| EP | 1533323 B1 | 3/2014 |
| JP | 09291109 A | 11/1997 |
| JP | 2001-259566 A | 9/2001 |
| JP | 2003-292525 A | 10/2003 |
| JP | 2004-279017 A | 10/2004 |
| JP | 2006-266552 A | 10/2006 |
| WO | WO 2010006983 A1 * | 1/2010 |

OTHER PUBLICATIONS

Kawai, N., et al.; "Polymer collection method involves pushing polymer with water from high pressure area to low pressure area so that moisture in polymer is evaporated", WPI/THOMSON, vol. 2001, No. 7, Nov. 7, 2000. XP002505874 Abstract.

Hagberg, Carl G.; "Comparison of solution rubber finishing processes—part I", NFM Welding Engineers, Mar. 2000, pp. 17-19, 23.

Hagberg, Carl G.; "Comparison of solution rubber finishing processes—part II", NFM Welding Engineers, Apr. 2000, pp. 28-30.

Whelan, Tony, "Halobutyl Rubber", Polymer Technology Dictionary, Chapman & Hall, London, UK, 1994, pp. 178-179.

Witte, Daniel U., "Computer Scale-up Model for Desolventizing Highly Viscous Polymers in Kneader Equipment", presented at the Annual Technical Conference (ANTEC) 2005, Chicago, IL, USA, pp. 1-6.

Tadmor, Zehev et al., "Devolatilization", Chapter 8, Principles of Polymer Processing, Second Edition, John Wiley & Sons, Inc., 2006, New York, NY, USA, p. 409.

Schrader, George F. et al., "Plastics Processing", Chapter 7, Nonmetallic Materials, Manufacturing Processes & Materials, Society of Manufacturing Engineers, Dearborn, MI, USA, 2000, pp. 126-135.

* cited by examiner

PROCESS FOR THE PRODUCTION OF WATER AND SOLVENT-FREE POLYMERS

The present invention relates to water and solvent-free polymers, in particular water and solvent-free synthetic rubber products like non-halogenated and halogenated butyl rubber products as well as a process for the production thereof. The invention further relates to a device suitable to accomplish said process.

Synthetic rubbers have important industrial uses and are typically produced by the (co)polymerization of monomers, which is typically carried out via slurry, emulsion or solution processes. Examples of synthetic rubbers include butyl rubbers and halogenated butyl rubbers, polyisobutylene, ethylene propylene diene M-class rubbers (EPDM), nitrile butadiene rubbers (NBR) and styrene-butadiene rubbers (SBR).

After the (co)polymerization, the reactor discharge mixture contains at least the polymer, solvents, residual monomers and the catalyst. To recover the polymer, the discharge stream is typically treated with steam and hot water. Most of the solvent and the unreacted monomers are thereby flashed off. One disadvantage of the contact with steam and water is, that synthetic rubbers are coagulated. The rubber polymers are then present in the form of wet crumbs in water. Most of the water is then be separated by draining, followed e.g. by the application of drying extruders and a final vacuum drying step.

Copolymerization of isobutene and isoprene, which leads to butyl rubber, for example is carried out industrially at low temperatures of approximately −60° C. to −100° C. to obtain high molar masses. The slurry process uses chloromethane as a diluent while the solution process uses an inert hydrocarbon as a solvent. After the polymerization, the butyl rubber polymer is present either as a slurry in chloromethane or as a homogeneous solution in a hydrocarbon. Unreacted monomers are also present in the reactor discharge mixture. The butyl rubber polymer needs to be recovered and isolated from the diluent or solvent.

In the slurry process, the polymerization reactor discharge stream is treated with steam and hot water in a flash drum. Most of the chloromethane and the unreacted monomers are thereby flashed off and the water is separated from the vapors by condensation. When the polymer from the reactor is to be processed further, such as by halogenations, the butyl rubber product may be recovered directly as a solution by discharging the reactor content into a hot solvent such as hexane. The chloromethane is evaporated after this stage and a further stripping stage is applied to remove remaining monomer residues.

In the solution process, an inert hydrocarbon solvent and an aluminium alkyl halide catalyst are applied during the polymerization step. The remaining monomers are then removed from the reactor solution in a distillation stripping process. After this distillation step, the butyl rubber polymer is present as a homogeneous solution in a hydrocarbon. This solution can either be processed further, such as being subjected to a halogenation step, or the butyl rubber polymer can be isolated directly from the solution. The isolation of the butyl rubber from solution is similar to that of the slurry process and also involves contact with steam and hot water, whereby the polymer coagulated. The butyl rubber polymer is then present in the form of wet crumbs in water (6 to 10 wt % polymer in water). To counteract the coagulation, salts of fatty acids are added in the flash drum containing the butyl rubber crumbs in water following the coagulation/steam stripping process. After the addition of additives, butyl rubber is then converted into the final commercial bale form through further drying. The drying is typically effected by draining, followed by the application of drying extruders and a final drying step in a fluidized bed.

A commercially important chemical modification of butyl rubber is halogenation which leads to chlorinated and brominated butyl rubber, hereinafter also denoted as halobutyl rubbers or individually as bromobutyl rubber or chlorobutyl rubber.

Halobutyl rubber is technically produced by contacting a solution of regular butyl rubber in an alkane with chlorine or bromine in an agitated vessel. Said solution is generally denoted as cement. Unreacted halogen and hydrogen halide formed as byproduct are neutralized by the addition of a caustic solution. Additives can also be incorporated at that stage. The resulting solution is then steam-stripped to remove the solvent, thereby coagulating the rubber into a solid product. The solid product is generally recovered as a 5 to 12% slurry in water. Stabilizers and/or antioxidants are added to the halogenated butyl rubber immediately before recovery. The halogenated butyl rubber is then finished using mechanical drying equipment in a process analogous to that used for regular butyl rubber; however, because of the greater reactivity of the halogenated product, less severe conditions are employed.

The aforementioned processes for coagulation and steam stripping suffer from very high energy consumption. A large amount of steam is necessary not only to evaporate the solvent but also to heat and maintain the complete water content of the stripping drums at a high temperature. Additional steam addition is also necessary to strip off residual amounts of solvent by lowering the partial pressure of the solvent in the stripping drum.

The aforementioned processes also utilize a large amount of water because the concentration of butyl rubber in the slurry after coagulation is generally only 5 to 12% by weight and only 5% to 20% for halogenated butyl rubbers. All water from this slurry constitutes waste water and must be disposed of. While the waste water contains sodium salts from the neutralization, reworking and recycling the waste water to remove the sodium salts is not economically viable because the salt concentration is too low.

The rubber crumbs are separated from the bulk water mechanically using simple sieve trays or screens. The (halo) butyl rubber still contains approximately 30 to 50% water after this first separation. Further mechanical drying is then conducted using extruders by kneading the product and squeezing out the water. The disadvantage of this mechanical drying process is the contamination of water by small rubber particles that were not held back by the sieves with the result that the waste water requires additional treatment.

The aforementioned mechanical dewatering can only diminish moisture content down to approximately 5 to 15%. Additional thermal drying stages are then required. The rubber is thereby heated to 150 to 200° C. under pressure in a single screw or twin screw extruder. A die plate is installed to maintain the pressure. When the rubber is pushed through the die plate, the water in the rubber evaporates and forms open porous crumbs. A cutting device then cuts the crumbs into small pieces. The crumbs are conveyed to a convective dryer where residual moisture is removed by hot air. After such drying, the (halo)butyl rubber generally has a moisture content of 0.1 to 0.7%. A cooling stage, accomplished by flowing cold air through the rubber crumbs, is then needed to cool the butyl rubber crumbs down to the maximum baling temperature of 60 ° C.

The crumbs are then formed into bales by hydraulic presses, and the bales are packed into boxes or crates for shipment.

The aforementioned processes for drying (halo)butyl rubbers is complex and requires extensive equipment. Furthermore, the process parameters must be carefully monitored to avoid heat and shear stress, which would accelerate degradation of the (halo)butyl rubber.

Various other special processes have been developed with the aim of removing water and volatile organic solvents from polymers. Extruder degassing in vacuum with or without the use of entrainers has gained acceptance in practical applications as the most important technique, however, the energy requirements of such prior art processes are quite high.

U.S. Pat. No. 3,117,953 A1 discloses an apparatus and process for purifying high pressure polyethylene. The substitution of synthetic rubber cement for polyethylene in U.S. Pat. No. 3,117,953 A1 would, however, result in crumbs being formed prior to entering the extruder, which is not desirable at all.

DE 195 37 113 discloses a method and an apparatus for polymer resins in particular polycarbonate resins using a steam stripper a decanter and an extruder. However, the introduction of steam would result in an undesireable high content of residual water or a very high energy consumption.

U.S. Pat. No. 4,055,001 discloses a method for the preparation of polymers such as butyl rubber having a water content of less than 0.1 wt.-% by using ultrasound sonotrodes during the drying process. However, the very high shear stress associated with the use of ultrasound is prohibitive for polymers such as halobutyl rubbers.

EP 0 102 122 discloses a method for polymer recovery from a solution, in particular for recovery of polyethylene, using a partially filled extruder. However, EP 0 102 122 is silent about the removal of residual water.

US 2001/056176 A1 discloses a one step method of recovering a polymer and specifically an example for the concentration of rubber solutions. The rubber solution is thereby heated with steam in order to remove existing solvents in one step by degassing under vacuum to produce white crumb. US 2001/056176 A1 thereby requires a large volumetric vapor flow to remove the volatile components at low vapor pressure and results in the enclosure of additional water in the crumbs, which water would subsequently need to be removed.

U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable.

EP 1 127 609 A2 discloses a process to treat a product in at least one kneader. EP 1 127 609 A2 uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. The kneaders used in EP 1 127 609 A2 require a great deal of maintenance and cleaning. The introduction of mechanical energy via the kneader is furthermore strongly dependent on the viscosity of the product, which reduces the flexibility of the process.

EP 1 165 302 A1 discloses a device and method for degassing plastics. The apparatus in EP 1 165 302 A1 is an extruder with a rear vent and several vent sections operated under vacuum. The vacuum is needed to achieve low residual volatile concentrations. EP 1 165 302 A1 discloses that a stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further.

In "Process Machinery", Parts I and II, March and April 2000; Author: C. G. Hagberg, a direct volatilization of rubber solutions using a flash tank and an extruder is disclosed. However, this reference is silent about the contents of volatile compounds in the final product.

In view of the foregoing, an object of the present invention was therefore to provide a continuous, energy efficient, ecologically and economically favourable process to remove volatile compounds from a fluid containing at least one polymer, preferably at least one synthetic rubber, producing a polymer product that is substantially free of volatile compounds.

This object is solved by a process of removing volatile compounds from a fluid (F) containing at least one non-volatile polymer and at least one volatile compound which comprises at least the steps of:
a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H),
b) reheating the concentrated fluid (H) from step a) in at least one reheating unit to obtain a reheated concentrated fluid (L);
c) feeding the reheated concentrated fluid (L) from step b) into at least one extruder unit comprising at least an extruder degassing section comprising at least a conveying section, a vent port with one or more vapor lines, a accumulating section and an outlet section, whereby volatile compounds are removed through the vent ports and vapor lines;
whereby the reheated concentrated fluid (L) is free-flowing upon entering the extruder degassing section and the product (P) obtained at the outlet section is substantially free of volatile compounds.

It is pointed out that the scope of the invention also encompasses any desired combinations of the ranges and areas of preference specified for each feature.

In the context of this invention, the term "free-flowing" means a viscosity in the range of 500 to 50.000.000 mPa*s, preferably 5.000 to 30.000.000 mPa*s and most preferably 10.000 mPa*s to 300.000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples.

In the context of this invention, the term "substantially free of volatile compounds" means a total concentration of volatile compounds of less than 1 wt %, preferably less than 0.5 wt % based on the mass of the non-volatile polymer.

In particular, the term "substantially free of volatile compounds" means substantially free of water and substantially free of volatile organic compounds.

Non-volatile polymers are considered to be substantially free of water, if the residual water concentration is less than 0.5 wt % preferably less than 0.25 wt %, more preferably less than 0.1 wt % and most preferably less than 0.075 wt % based on the mass of the polymer.

In the context of this invention, the term "volatile organic compounds" means organic compounds having a boiling point of below 250° C. at standard pressure.

Non-volatile polymers are considered substantially free of volatile organic compound, if the residual concentration of said volatile organic compounds is less than 0.75 wt % preferably less than 0.25 wt % and most preferably less than 0.1 wt % based on the mass of the polymer. Said volatile organic compounds are typically the solvents employed in the polymerization or subsequent processing steps like a halogenation step and include hydrocarbons like hexanes and pentanes.

Preferred non-volatile polymers are synthetic rubber products.

In the context of this invention, the term synthetic rubber products includes butyl rubbers and halogenated butyl rubbers, polyisobutylene, ethylene propylene diene M-class rubbers (EPDM), nitrile butadiene rubbers (NBR) and styrene-butadiene rubbers(SBR). Preferred synthetic rubber products are butyl rubbers and halobutyl rubbers like bromobutyl and chlorobutyl rubber, whereby bromobutyl rubber is even more preferred.

In the context of this invention butyl rubber denotes a (co)-polymer of isobutene (2-methylpropene) and isoprene (2-methylbuta-1,3-diene). On a molar basis, the isoprene content in the polymer is between 0.001% and 5, preferably between 1.8 and 2.3 mol %. Butyl rubber is composed of linear polyisobutene chains with randomly distributed isoprene units. The isoprene units introduce unsaturated sites into the polymer chain to enable vulcanization. The mass average molecular weight of butyl rubber molecules Mw is typically between 50,000 and 1,000,000 g/mol, preferably between 300,000 and 1,000,000 g/mol.

The halogenated butyl rubbers also contain a certain amount of halogen chemically bound to the rubber molecules. The amount of chemically bound halogen is typically in the range of more than 0 to 3 wt % with respect to total mass of the polymer. The (halo)butyl rubbers may also contain additives, e.g. 0.0001 to 4 phr (phr=parts per hundred rubber with respect to rubber weight), epoxidized soy bean oil (ESBO), 0.0001 to 5 phr calcium-stearate and 0.0001 to 0.5 phr antioxidants. Other additives are also applicable, dependent on the application of the butyl rubber product, i.e. fillers or colorants.

In case of bromobutyl rubber, the typical bromine content in the finished product is 1.5 to 2.5 wt %, preferably 1.6 to 2.0 wt %.

In case of chlorobutyl rubber, the typical chlorine content in the finished product is 1.0 to 1.5 wt %, preferably 1.15 to 1.35 wt %.

The subject of the invention will be described in more detail by means of schematic drawings in which.

Figure 1:
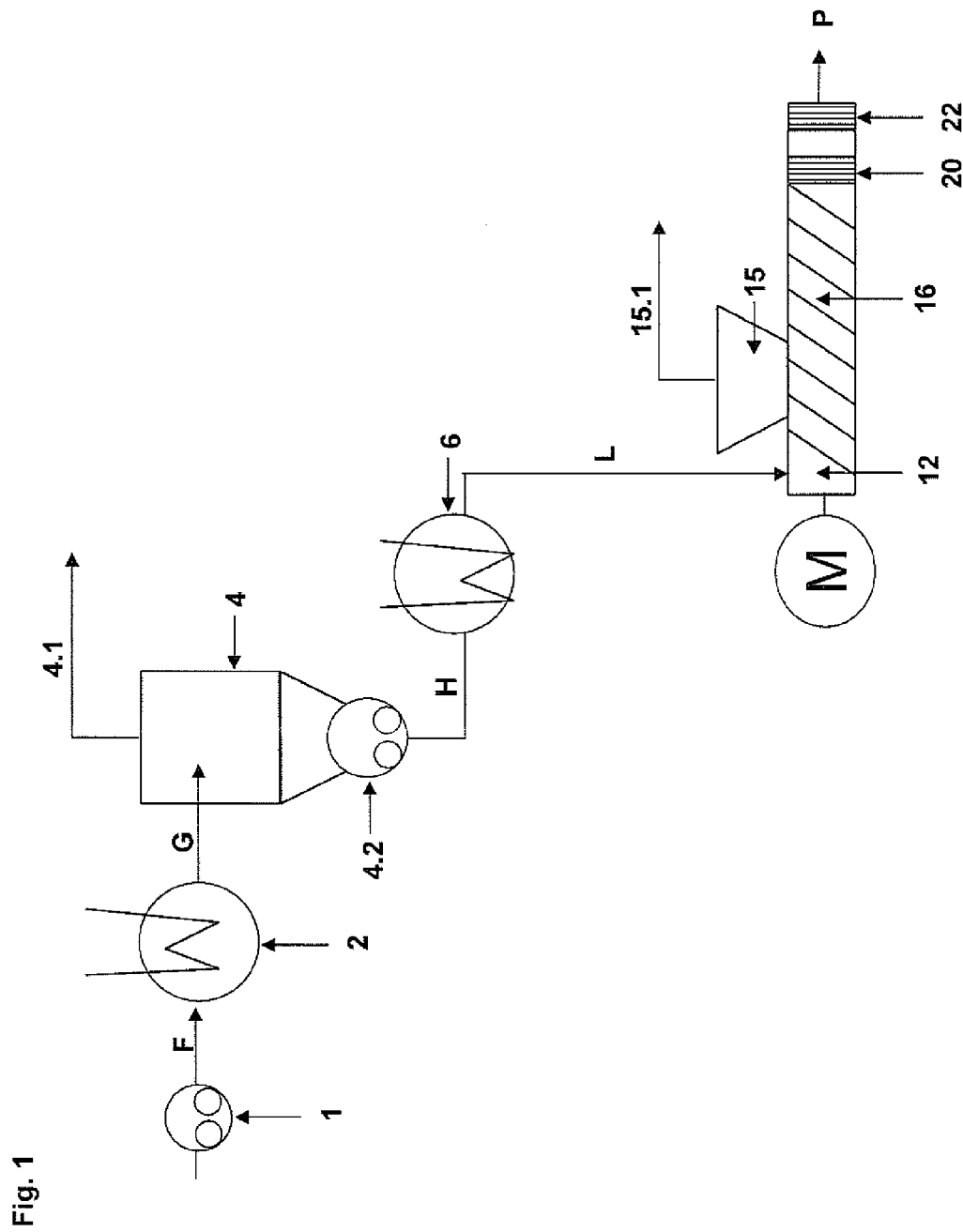
FIG. 1 shows a single-stage concentrator unit, a reheating unit and an extruder unit comprising one extruder degassing section, one accumulating section and one outlet section.

A basic and exemplary embodiment of the process step is shown in FIG. 1. In step a) Fluid F containing at least one non-volatile polymer and at least one volatile compound is transferred via pump 1 to the heater 2, where the fluid F is heated.

Fluid F, also called cement, contains for example from 3 to 50 wt % of a non-volatile polymer, preferably a synthetic rubber and more preferably a (halo)butyl rubber and from 60 to 97 wt% volatile compounds, in particular a solvent or a solvent and water, whereby the aforementioned components add up to 90 to 100, preferably 95 to 100 wt % of the total mass of fluid F.

The solvent is preferably selected from the group consisting of linear or branched alkanes having between 4 and 10 C atoms, preferably 4 to 7 C atoms. More preferred solvents are n-pentane, iso-pentane, n-hexane, cyclohexane, iso-hexane, methyl-cyclopentane, methyl-cyclohexane and n-heptane as well as mixtures comprising or consisting of those alkanes.

In a preferred embodiment of the invention, fluid F contains from 3 to 40 wt % of a non-volatile polymer, preferably a synthetic rubber and more preferably (halo) butyl rubber, from 60 to 95 wt % volatile organic compounds, in particular a solvent, and from 0.5 to 20 wt % water, whereby the aforementioned components add up to 95 to 100 wt % of the total mass of fluid F.

The fluid F is typically obtained from polymerization processes or subsequent processing steps. A subsequent processing step is for example the halogenation of butyl rubber. Fluids F containing water are typically obtained after steam stripping processes following the polymerization.

The fluid F entering the heater typically and preferably has a temperature of 10° C. to 100° C., preferably of 30° C. to 80° C. The viscosity of fluid F is for example in the range of 100 mPa*s to 25,000 mPa*s, preferably in the range of 500 mPa*s to 5,000 mPa*s.

A heater may be any device that is able to raise the temperature of Fluid F. In a preferred embodiment, heater 2 is a heat exchanger. The heating medium is selected from the group consisting of steam, heating oil or hot pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Upon heating, heated fluid G is obtained. The heated fluid G has a higher temperature than fluid F, preferably a temperature of 100to 200° C., more preferably 110° C. to 190° C. and even more preferably 120° C. to 175° C. The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 hPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

In a preferred embodiment of the invention the degassing vessel is designed in the shape of a cyclone to further aid separation of vapor from heated fluid G. In another preferred embodiment of the invention the degassing vessel 4 has a conical or at least torisperical shaped bottom, to allow the vessel being emptied completely or substantially complete.

In another embodiment the inner surface of the degassing vessel can be heated.

The pump 4.2 is preferably directly connected to the outlet of the degassing vessel 4. In general, the connection piece between pump and vessel is preferably as short as possible.

Due to the high viscosity of the concentrated fluid H at this stage, the inlet of the pump is preferably designed with a large inlet, thereby reducing the pressure drop at the inlet.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step a) is for example dependent on the temperature of fluid G and the pressure in the degassing vessel 4. In a preferred embodiment of the invention the temperature of fluid G and the pressure in the degassing vessel 4 are chosen so that the concentrated fluid H is still free-flowing as defined above and comprises for example from 10 to 60, preferably from 25 to 60 wt % of a non-volatile polymer, preferably a synthetic rubber and more preferably (halo)butyl rubber and from about 40 to about 90, preferably from 40 to 75 wt % volatile compounds whereby the aforementioned components non-volatile polymer, volatile organic compound and water add up to 90 to 100 wt %, preferably to 95 to 100 wt % of the total mass of fluid H.

In a preferred embodiment and where the feedstock fluid F comprises water, fluid H for example comprises from 10 to 60, preferably from 25 to 60 wt % of a non-volatile polymer, preferably a synthetic rubber and more preferably (halo)butyl rubber, from about 25 to about 90, preferably from 25 to 75 wt % volatile organic compounds, in particular a solvent, and about 0.5 to about 15 wt % water, whereby the aforementioned components non-volatile polymer, volatile organic compound and water add up to 90 to 100 wt %, preferably 95 to 100 wt % of the total mass of fluid H.

The temperature of the concentrated fluid H is lower than that of heated fluid G and is for example in the range of 15 to 100° C., preferably in the range of 30 to 100° C. The concentrated fluid H is still free-flowing as defined above.

In step b), the concentrated fluid H obtained in step a) is then passed through a reheating unit 6 to obtain a reheated concentrated fluid L. The a preferred embodiment the reheating unit comprises a heat exchanger, whereby the same disclosure including the preferences with regard to heating media and heat exchanger types apply as described above for heat exchanger 2.

The temperature of the reheated concentrated fluid L is higher than that of the concentrated fluid L and is for example in the range 50° C. to 200° C., preferably in the range of 90° C. to 180° C. The reheated concentrated fluid L is still free-flowing as defined above.

In step c), the reheated concentrated fluid L obtained in step b) is passed on to a extruder unit and fed into the conveying section 16 of the extruder degassing section at the feeding point 12.

Suitable extruder types include single screw and multiscrew extruders comprising any number of barrels and types of screw elements and other single or multishaft conveying kneaders. Possible embodiments of multiscrew extruders are twin-screw extruders, ring extruders or planetary roller extruders, whereby twin-screw extruders and planetary roller extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions.

Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The conveying section 16 is open to a vent port 15. In the conveying section 16 a part of the solvent is evaporated and separated from the reheated concentrated fluid L. The vapors are removed through the vent port 15 via a vapor line 15.1.

Since the evaporation volatile compounds have a tendency to entrain the reheated concentrated fluid L or the Product P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer screws, that are mounted on the vent ports and convey any material back into the extruder, or rollers or belts, that are applied to the inside of the vent ports to push deposited material back into the extruder. As an alternative or in addition to the aforementioned, coatings of the vent ports may be applied which reduce or prevent sticking of the material to the surface. Suitable coatings include DLC, Ethylene-Tetrafluoroethylene (ETFE), Polytetrafluoroethylene (PTFE) and Nickel-Alloys.

The pressure at the vent port 15 is for example between 1 hPa and 2,000 hPa, preferably between 5 hPa and 900 hPa.

The vapor line 15.1 may be and is preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid F.

The conveying section 16 is terminated by a accumulating section 20. The purpose of the accumulation is to assure a certain pressure level in the vent port 15 and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements, single flighted tooth mixing elements with grooves, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder. While passing from the conveying section 16 and the accumulating section 20 to the outlet section 22 the reheated concentrated fluid L undergoes a transition from the free-flowing reheated concentrated fluid L to the product P, which typically has a crumbly appearance.

The outlet section 22 typically comprises means to allow the product to exit the extruder and optionally but preferably product processing equipment. Examples of suitable product processing equipment includes combinations of die plates and cutters; die plates and underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knifes placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The product P may then be processed further for final packing and shipping. (Halo)butyl rubber for example is cooled to a temperature of or below 60° C., formed into bales e.g. by a hydraulic press, and then packed into boxes or crates for shipment.

In general, an increasing feed rate of the reheated concentrated fluid L at the feeding point 12 requires a corresponding increase in the screw speed of the extruder. Moreover, the screw speed determines the residence time of fluid L. Thus, the screw speed, feed rate and the extruder diameter are typically interdependent. Typically the extruder is operated in such a manner that the dimensionless throughput $V/n*d^3$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the synthetic rubber product contained in Fluid L and the target values of remaining volatile compounds. Given these properties, however, the operating parameters can be determined by one skilled in the art by some initial experiments.

In one embodiment of the invention the extruder is operated at a feed rate of 5 to 25,000, preferably of 5 to 6,000 kilograms per hour.

Generally, the degassing in the extruder may be aided by the addition of a stripping agent that is removed together with other volatile compounds. Even though the stripping agent may be added anywhere in the extruder unit, the addition in one or more accumulating sections is preferred.

In a more preferred embodiment a stripping agent is added in one or more accumulating sections except the last one (20).

Suitable stripping agents are substances that are inert to the reheated concentrated fluid (L) and/or the product (P) and have a vapor pressure greater than 100 hPa at 100° C.

In the context of the invention, the term "inert" means that the stripping agent does not or virtually not react with the polymers contained in the reheated concentrated fluid (L) and/or the product (P). Suitable stripping agents are nitrogen, carbon dioxide, noble gases, propane, butane, water or a mixture of the aforementioned substances. The amount of stripping agent may be 0.0001 to 10, preferably 0.001 to 5 and more preferably 0.1 to 2 wt-% based on the amount of the polymer product obtained at the outlet section.

The invention further relates to a device suitable to accomplish the process according to the invention. Therefore the invention also encompasses a device comprising a least
- one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)
- one heating unit (6) in communication with the pump (4.2) of the concentrating unit and a feeding point (12) on an extruder unit
- one extruder unit comprising at least one feeding point (12), one extruder degassing section (16), one accumulating section (20) and one outlet section (22), whereby the extruder degassing section (16) further comprises at least one vent port (15) connected to a vapour line (15.1).

In the context of this invention the term "in communication" includes direct or indirect connections whereby indirect connections may be accomplished for example via tubes or pipes. The term "in communication" further includes the option that between the units or means in communication further units or means are arranged.

Figure 2:
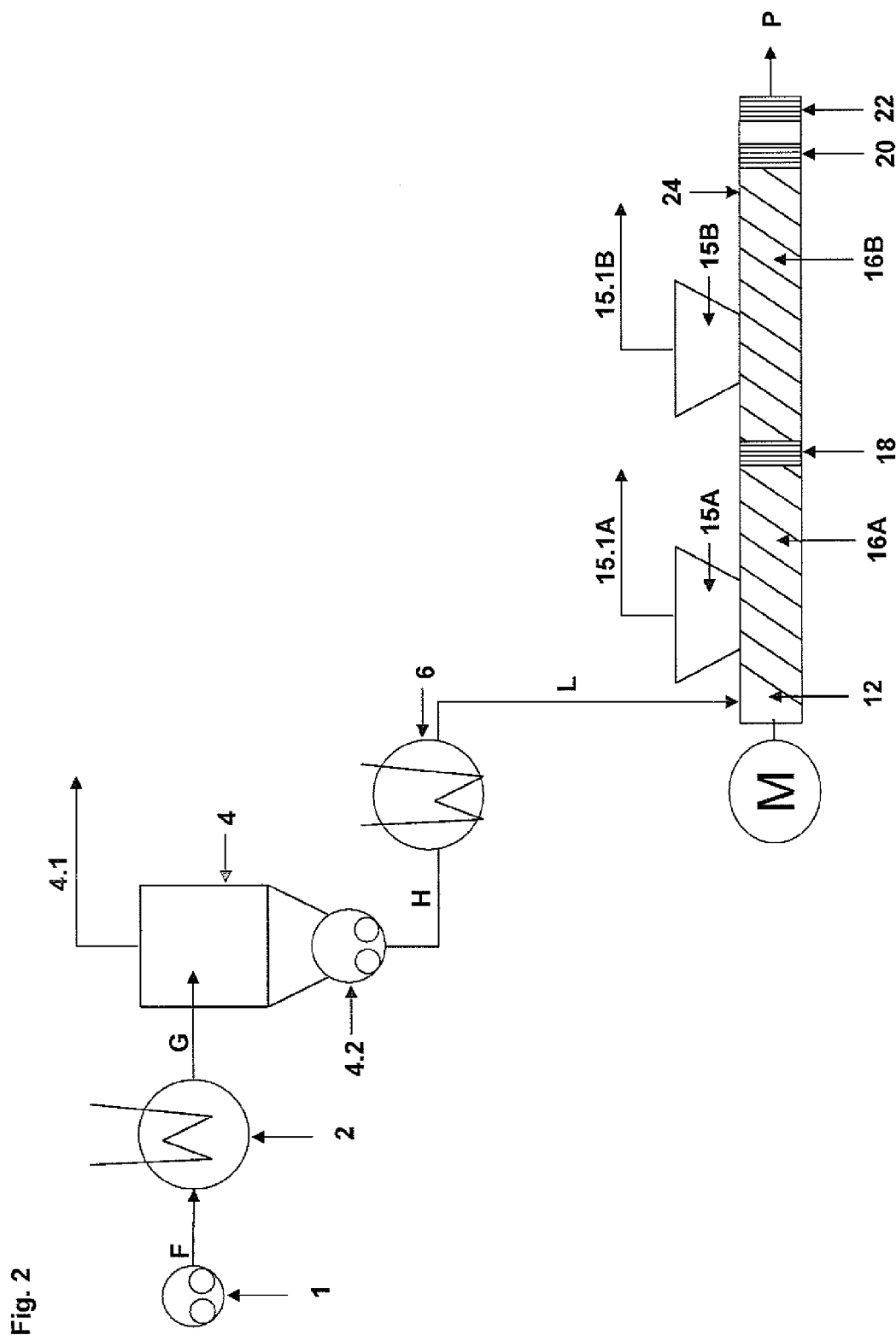
FIG. 2 shows a single-stage concentrator unit, a reheating unit and an extruder unit comprising two extruder degassing sections, two accumulating sections and one outlet section.

Another embodiment of the invention is shown in FIG. 2. FIG. 2 shows another flow chart and suitable device for the accomplishment of the process according to the invention comprising a concentrator unit with a pump 1, a heater 2, a degassing vessel 4, a vapour line 4.1 and a pump 4.2, a reheating unit comprising a heater 6 and an extruder unit comprising two extruder degassing sections having two conveying sections 16A and 16B each connected to a vent port 15A and 15 B and a vapour line 15.1A and 15.1.B, two accumulating sections 18 and 20 terminating the conveying sections 16A and 16B a an outlet section 22. In addition to that the extruder unit further comprises a side feeder 24.

Generally, the extruder unit may comprise one or more side feeders, which may positioned anywhere in the extruder, preferably in close proximity to the feeding point or the outlet section 22. Side feeders are suitable for the addition of additives to the polymer.

Examples of additives, in particular for (halo)butyl rubber products include stabilizing agents, acid scavengers like ESBO (epoxidized soy bean oil), stearates like calcium stearates, antioxidants and the like. Examples of suitable antioxidants include sterically hindered phenols like butylhydroxytoluenes and its derivatives like Inganox 1010 and 1076, amines, mercapto-benzimidazoles, certain phosphites and the like.

In particular, (halo)butyl rubbers are mixed with additives, e.g. 0.0001 to 4 phr epoxidized soy bean oil (ESBO), 0.0001 to 5 phr calcium-stearate and 0.0001 to 0.5 phr of antioxidants (phr=parts per hundred rubber with respect to rubber weight). Other additives are also applicable, dependent on the application of the butyl rubber product, i.e. fillers or colorants.

As an alternative or in addition to that, additives may also already be added to the fluid F or, as far as they are liquid together with the stripping agent.

In a preferred embodiment of the invention step a) is repeated a least once, preferably once or twice. The advantage of repeating step a) is that the total energy consumption to produce the concentrated fluid H can significantly reduced due to easier operation parameter optimization for each concentration unit. The repetition of step a) is preferably accomplished by connecting the respective number of concentrating units in series.

Figure 4:
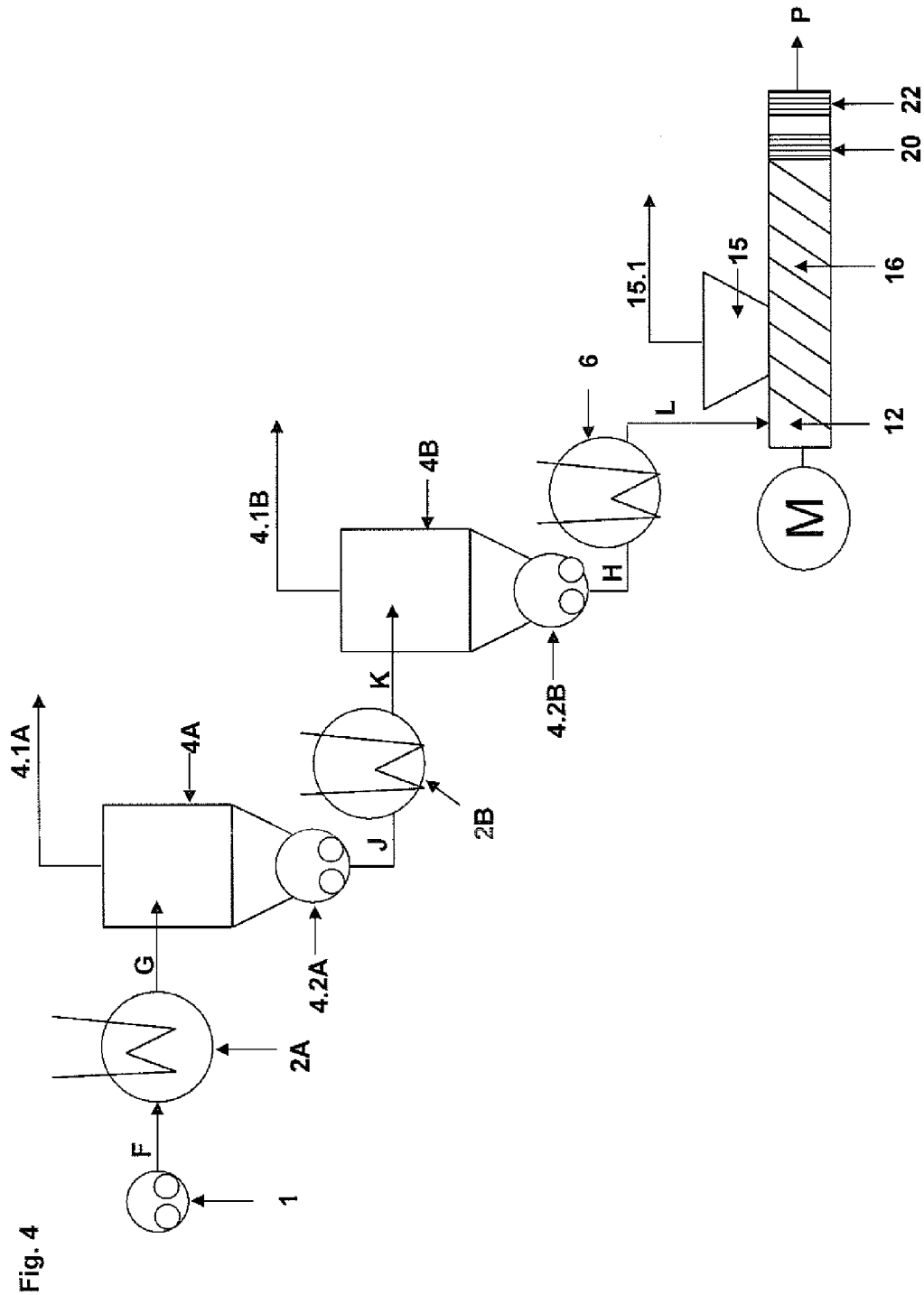
FIG. 4 shows a double-stage concentrator unit, a reheating unit and an extruder unit comprising one extruder degassing section, one accumulating section and an outlet section.

An example of this embodiment is shown in FIG. 4. FIG. 4 shows another flow chart and suitable device for the accomplishment of the process according to the invention comprising a double-stage concentrator unit with a pump 1, a first concentrator unit comprising heater 2A, degassing vessel 4A equipped with a vapour line 4.1A and a pump 4.2A, a second concentrator unit comprising heater 2B, degassing vessel 4B equipped with a vapour line 4.1B and a pump 4.2B, a reheating unit comprising a heater 6 and an extruder unit comprising two extruder degassing sections having two conveying sections 16A and 16B each connected to a vent port 15A and 15B and a vapour line 15.1A and 15.1.B, two accumulating sections 18 and 20 terminating the conveying sections 16A and 16B a an outlet section 22. The heated fluid G is subjected to the first concentration stage, thereby obtaining pre-concentrated fluid J, which is then reheated by heater 2B to obtain the reheated pre-concentrated fluid K, which is then subjected to the second concentration stage, whereby concentrated fluid H is obtained. Concentrated fluid H is then processed further as described above.

In a preferred embodiment of the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

Figure 3:
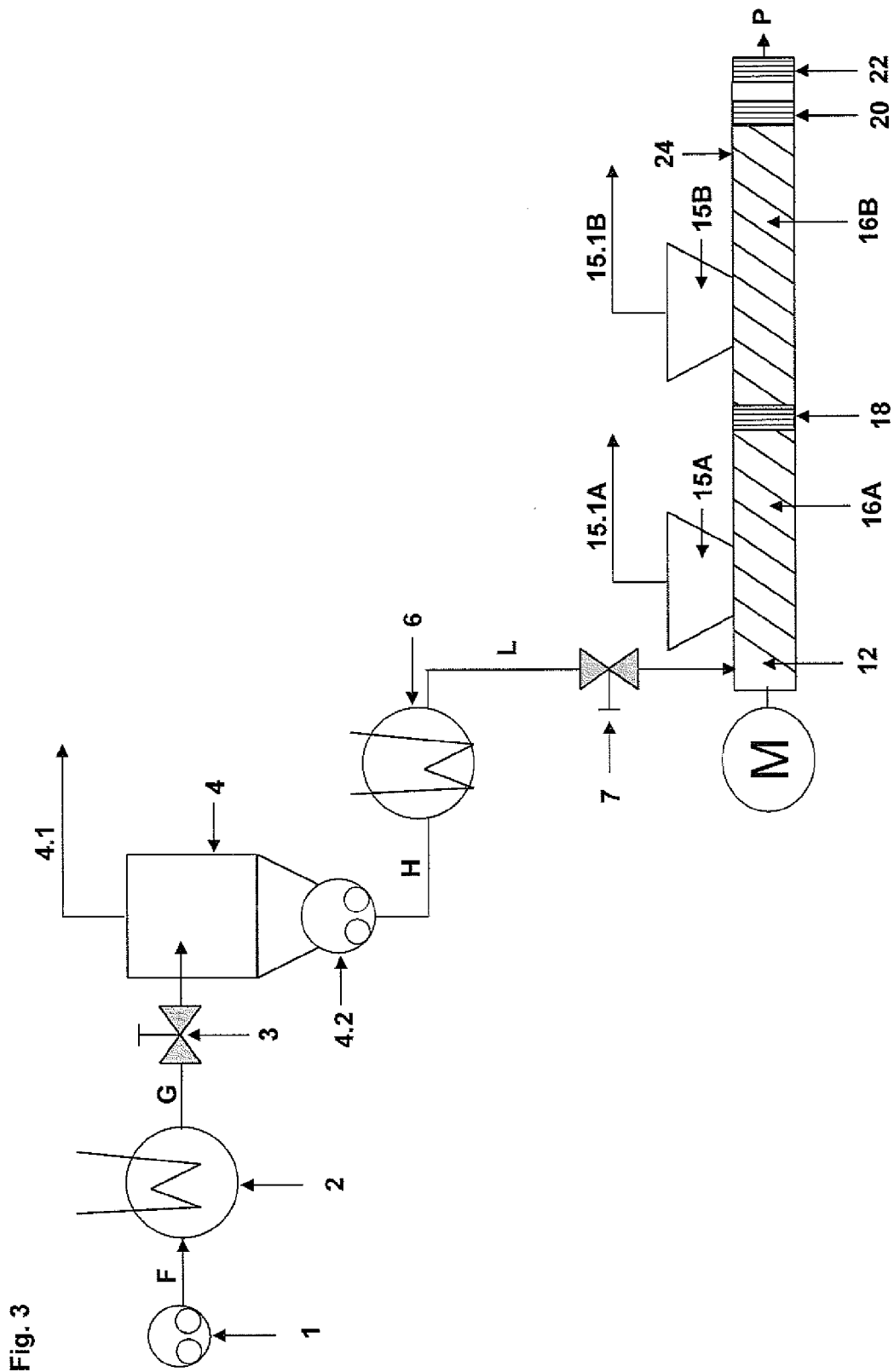
FIG. 3 shows a single-stage concentrator unit having a pressure relief valve, a reheating unit and an extruder unit having a pressure relief valve and further comprising two extruder degassing sections, two accumulating sections, a side feeder and an outlet section.

A further embodiment of the invention having additional pressure control devices is shown in FIG. 3 which is apart faun the pressure control devices very similar to FIG. 2. The pressure of heated fluid G is controlled by the pressure control device 3, the pressure of reheated, concentrated fluid L entering the extruder is controlled by the pressure control device 7.

In a preferred embodiment of the invention the reheated concentrated fluid (L) is injected into the first extruder degassing section of the extruder unit, whereby the first extruder degassing section comprises one or more rear vent ports in upstream direction each connected to a vapor line.

The advantage of rear vent ports is that the volatile compounds present in the reheated concentrated fluid L undergo sudden and rapid evaporation, thereby effecting at least partial separation of the synthetic rubber product and the volatile compounds, the vapors emerging through the rear vents in upstream direction. Generally, from about 50 to about 99 wt-%, of the volatile compounds present in the fluid L is removed through the upstream vents.

Figure 5:
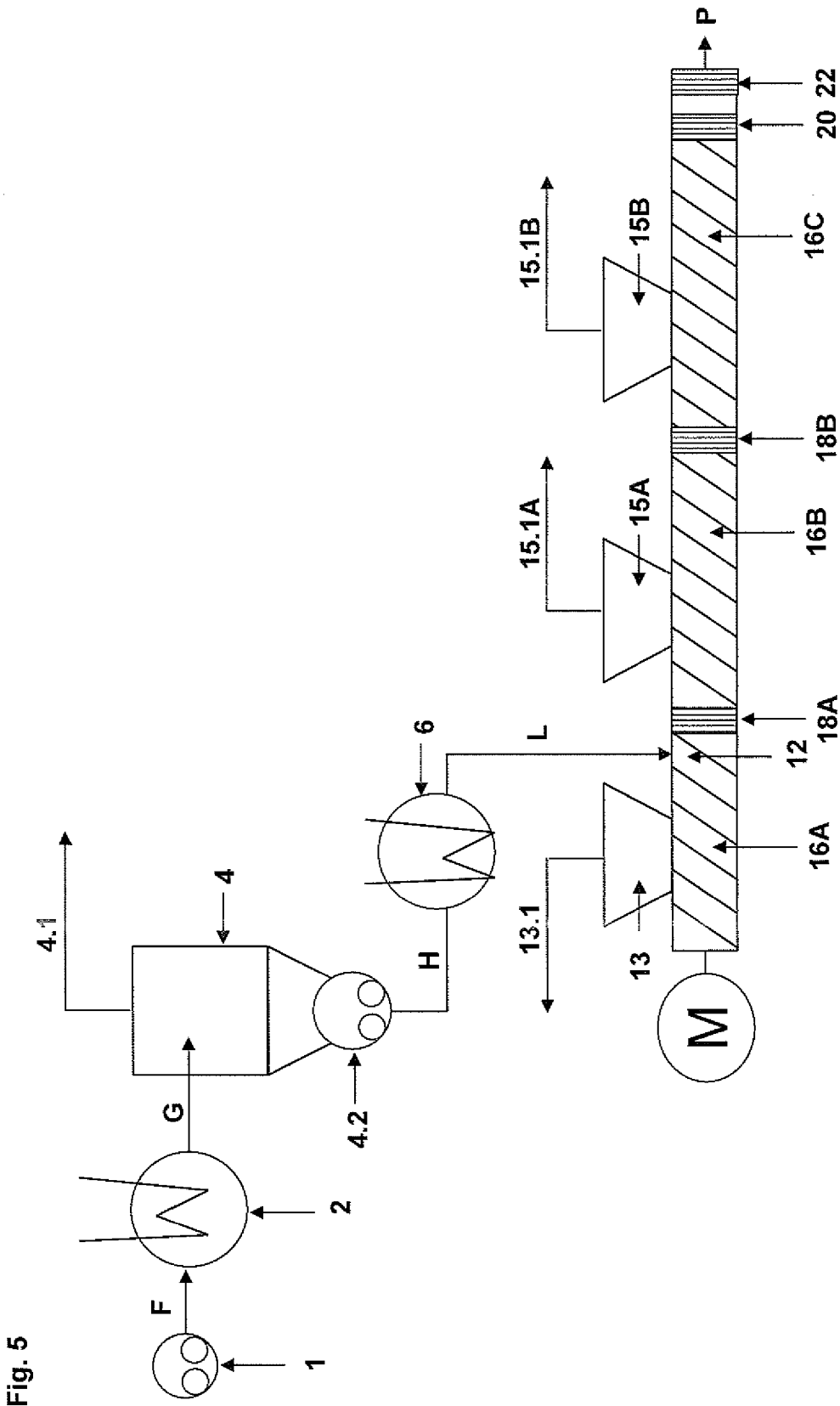
FIG. 5 shows a single-stage concentrator unit, a reheating unit and an extruder unit comprising three extruder degassing sections, three accumulating sections and one outlet section, whereby one extruder degassing section is a backward degassing section.

An example of this embodiment is shown in FIG. 5. FIG. 5 shows another flow chart and suitable device for the accomplishment of the process according to the invention comprising a single-stage concentrator unit with a pump 1, a concentrator unit comprising heater 2, degassing vessel 4 equipped with a vapour line 4.1 and a pump 4.2, a reheating unit comprising a heater 6 and an extruder unit comprising three extruder degassing sections, whereby the feeding point 12 is located at the first extruder degassing section, comprising a conveying section 16A, a rear vent port 13 connected to a vapor line 13.1 in upstream direction and whereby the extruder unit further comprises two downstream extruder degassing sections each comprising a conveying section 16B and 16C, a vent port, 15A and 15B, whereby the vent ports 15A and 15B are each connected to a vapour line 15.1A and 15.1B, and whereby each of the conveying sections 16A, 16B and 16C is terminated by a accumulating section 18A, 18B and 20 and whereby the extruder unit further comprises an outlet section 22. Generally the streams are processed as described above with the difference being that large amounts of fluid compounds present in the reheated concentrated fluid L are already removed via vent port 13 and the vapour line 13.1 connected thereto.

Figure 6:
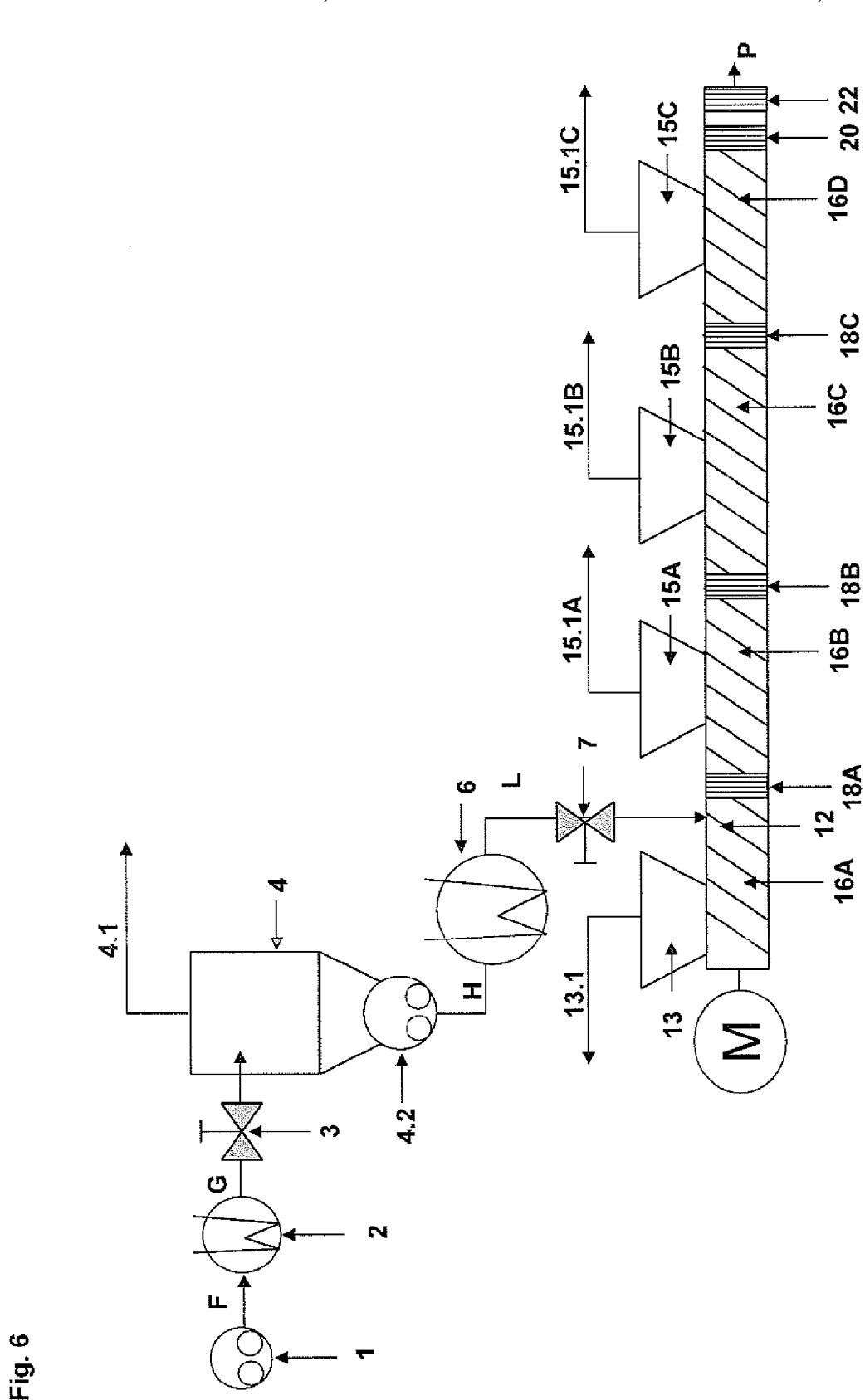
FIG. 6 shows a single-stage concentrator unit comprising a pressure regulation device, a reheating unit and an extruder unit comprising a pressure regulation device, four extruder degassing sections, four accumulating sections and one outlet section, whereby one extruder degassing section is a backward degassing section.

Another example of this embodiment is shown in FIG. 6. FIG. 6 shows another flow chart and suitable device for the accomplishment of the process according to the invention comprising a single-stage concentrator unit with a pump 1, a concentrator unit comprising a pressure control device 3, a heater 2, a degassing vessel 4 equipped with a vapour line 4.1 and a pump 4.2, a reheating unit comprising a heater 6 and an extruder unit comprising a pressure control device 7 upstream the feeding point 12 of the extruder, four extruder degassing sections, whereby the feeding point 12 is located at the first extruder degassing section, whereby the first extruder degassing section comprises a conveying section 16A, a rear vent port 13 connected to a vapor line 13.1 in upstream direction and whereby the extruder unit further comprises three downstream extruder degassing sections each comprising a conveying section, 16B, 16C and 16D, a vent port, 15A, 15B and 15C, whereby the vent ports 15A, 15B and 15C are each connected to a vapour line 15.1A, 15.1B and 15C, and whereby each of the conveying sections 16A, 16B, 16C and 16D is terminated by a accumulating section 18A, 18B, 18C and 20 and whereby the extruder unit further comprises an outlet section 22. Generally, the streams are processed as described above.

Fluid F, which is fed into the heater 2 typically, and as already disclosed above, contains for example from 3 to 50 wt % of a non-volatile polymer, preferably a synthetic rubber and more preferably a (halo)butyl rubber and from 60 to 97 wt % volatile compounds, in particular a solvent or a solvent and water, whereby the aforementioned components add up to 90 to 100, preferably 95 to 100 wt % of the total mass of fluid F and in a preferred embodiment from 3 to 40 wt % of a non-volatile polymer, preferably a synthetic rubber and more preferably (halo)butyl rubber, from 60 to 95 wt % volatile organic compounds, in particular a solvent, and from 0.5 to 20 wt % water, whereby the aforementioned components add up to 95 to 100 wt % of the total mass of fluid F.

Dependant on the source of fluid F it further may contain hydrophilic compounds which need to be removed to a certain extend in order to met the desired product specifications.

Furthermore, where fluid F contains water, it is desirable to lower the water content in order to improve the process with respect to its energy consumption.

It was found that a significant reduction of remaining hydrophilic compounds or water or both can be achieved in an advantageous way by preparing the fluid F in a process of removing hydrophilic compounds and optionally water from a crude fluid A containing at least one non-volatile polymer, at least one volatile organic compound, one or more hydrophilic compounds and optionally water which comprises at least the step of pre a) treating the crude fluid (A) in at least one pre-washing unit comprising at least a separating apparatus (26), whereby the fluid (A) is mixed with water to obtain an organic phase (28) comprising primarily non-volatile polymer and volatile organic compounds and an aqueous phase (27) comprising primarily water and hydrophilic compounds, and whereby the organic phase (28) is separated from the aqueous phase (27) in a separating apparatus (26) and further used as fluid F and whereby at least a part of the aqueous phase (27) is removed from the separating apparatus (fluid C).

In the context of this invention the term "hydrophilic compounds" denotes at least partially water-soluble volatile and non-volatile compounds. Examples include inorganic salts and in particular residues of catalysts employed for the polymerization reaction like e.g. aluminum salts, iron or other transition metal salts or halides resulting from halogenation reactions and neutralizations. Exemplary embodiments of step pre-a) are illustrated using FIGS. 8, 9, 10 and 11.

Figure 8:
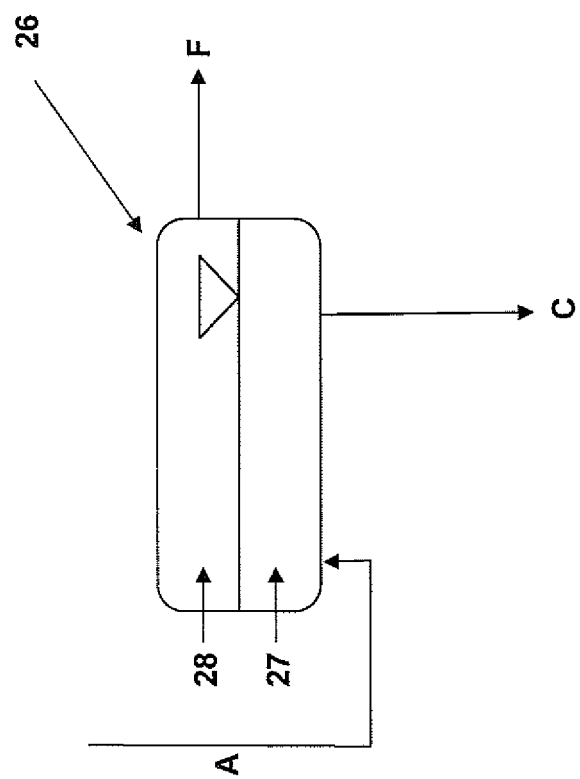
FIG. 8 shows a basic prewashing unit
Figure 9:
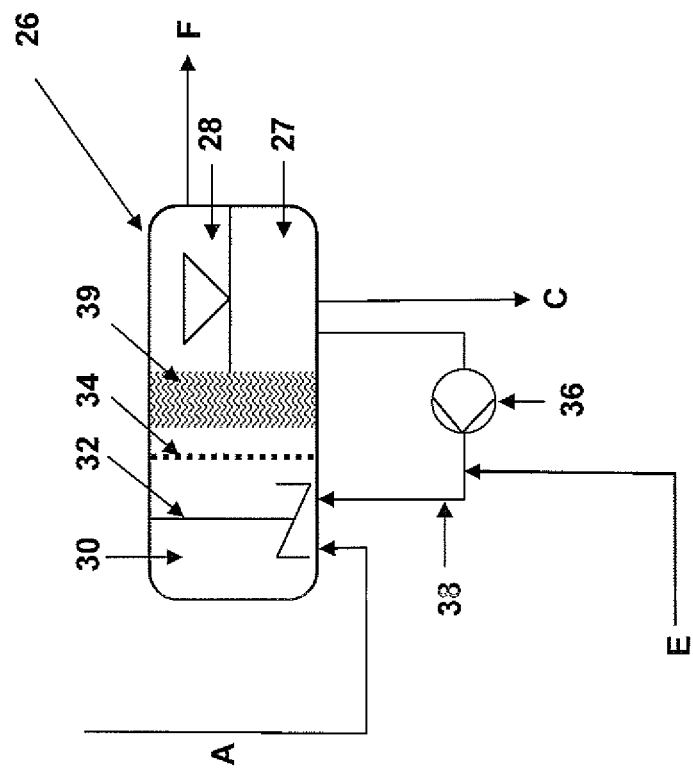
FIG. 9 shows a prewashing unit comprising a coalescer

A very basic and exemplary embodiment of the pre-washing step is shown in FIG. 8. In step pre-a) Fluid A containing at least one non-volatile polymer, at least one volatile compound and at least one hydrophilic compound is transferred to the separating apparatus 26, where it is mixed with water. Upon mixing with water an organic phase 28 and an aqueous phase 27 are obtained. The organic phase 28 is removed from the separating apparatus 26 and further used as fluid F, the aqueous phase 27 is at least partially removed from the separating apparatus 26 as fluid C, which is disposed of An improved embodiment of the pre-washing step is shown in FIG. 9. In step pre-a) crude fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed and subjected to the subsequent process according to steps a) to c) as fluid F.

Generally, the coalescer in the pre-washing step is beneficial, but not mandatory. It helps to collect and coalesce the droplets and guides them to the phase interface which typically results in shorter residence times. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope. Unstructured packings are for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In a preferred embodiment of the invention step pre-a) is repeated at least once, preferably once.

Figure 10:
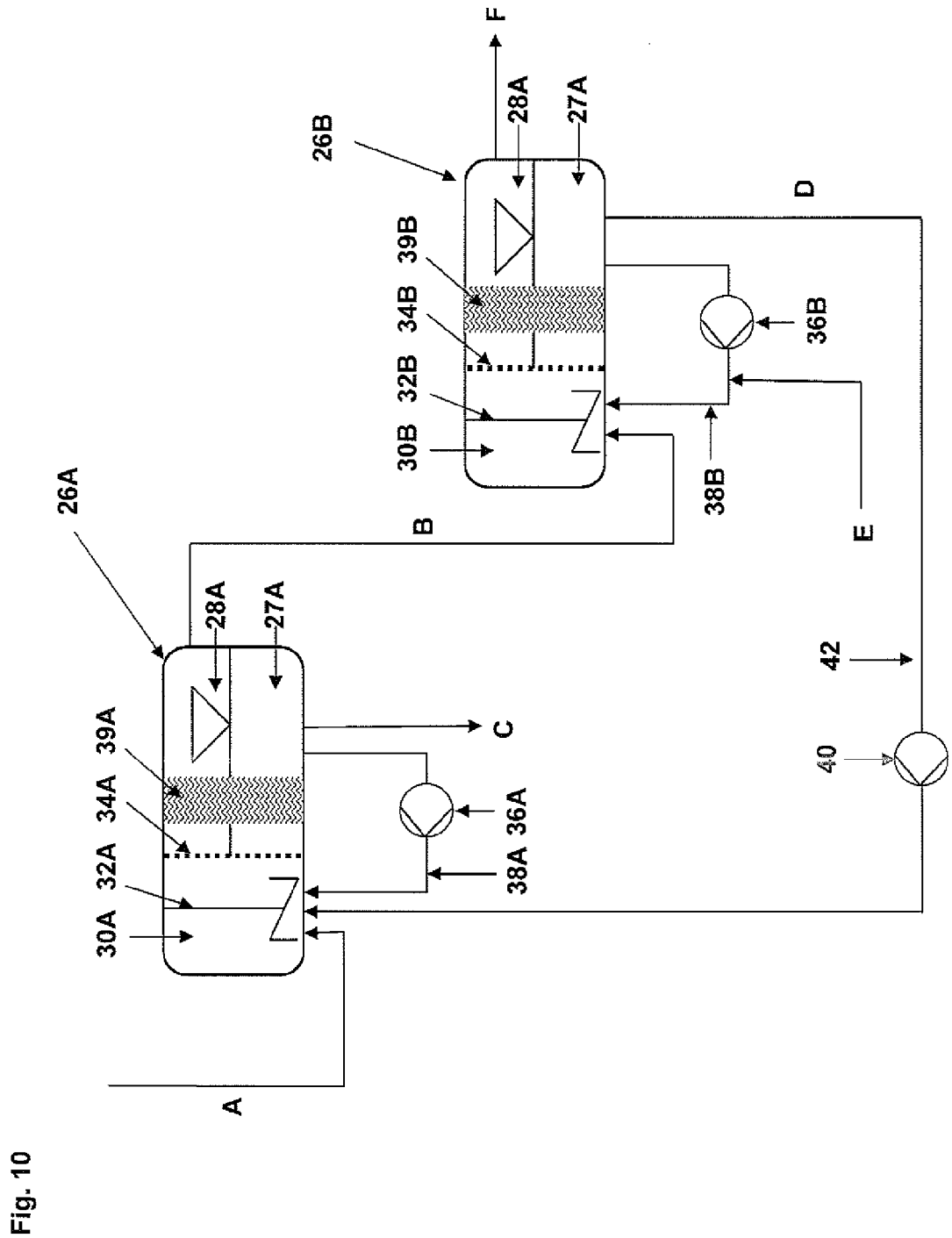
FIG. 10 shows a double-stage prewashing unit

A further improved and preferred embodiment of the pre-washing step is shown in FIG. 10. In step pre-a) of this double-stage prewashing step fluid A containing at least one non-volatile polymer, at least one volatile compound and at least one hydrophilic compound is fed to the mixing section 30A of a first separating apparatus 26A, which is equipped with a mixer 32A and passes through the separating wall 34A into a settling section, where the mixture separates into an aqueous phase 27A and an organic phase 28A, whereby the separation is supported by means of a coalescer 39A. A part of the aqueous phase 27A is removed from the separating apparatus 26A as fluid C, which is typically disposed of, with the rest being recycled via the recirculation line 38A by the action of recirculation pump 36A back into the mixing section 30A. The organic phase 28A is removed and fed as fluid B to the mixing section 30B of a second separating apparatus 26B, which is also equipped with a mixer 32B and passes through the separating wall 34B into a settling section, where the mixture separates into an aqueous phase 27B and an organic phase 28B, whereby the separation is supported by means of a coalescer 39.B. A part of the aqueous phase 27B is recycled to the mixing section 30A of the first separating apparatus 26A as fluid D by the action of recirculation pump 40 and recirculation line 42, with the rest being enriched with fresh water E and recycled via the recirculation line 38B by the action of recirculation pump 36B back into the mixing section 30B of the second separating apparatus 26B. The organic phase 28 leaving the second separating apparatus 26B is subjected to the subsequent process according to steps a) to c) as fluid F. An advantage of this double-stage pre-washing step is that fluid F is substantially free of hydrophilic compounds and the amount of waste water is reduced due to recycling which results in higher concentration of hydrophilic compounds in fluid C.

In a preferred embodiment of the invention the separation is performed at temperatures of more than 40° C. The upper limit depends on the constitution of the polymer and the construction of the separating apparatus. Typically the upper limit is 125° C.

In a more preferred embodiment of the invention the separation is performed at temperatures of 40 to 110° C. preferably at temperatures of 80 to 110°.

Depending on the composition of fluid A and the boiling points of the components thereof, the separating apparatus may be designed to be operated under pressure.

Generally, the efficiency of the pre-washing step increases with increased temperature.

In another embodiment of the invention the organic phase 28 leaving the separating apparatus may be pre-heated to facilitate the free-flow of fluid F. This purpose can also be accomplished by a heater, whereby heat exchangers as disclosed for heater 2 above are preferred.

Figure 11:
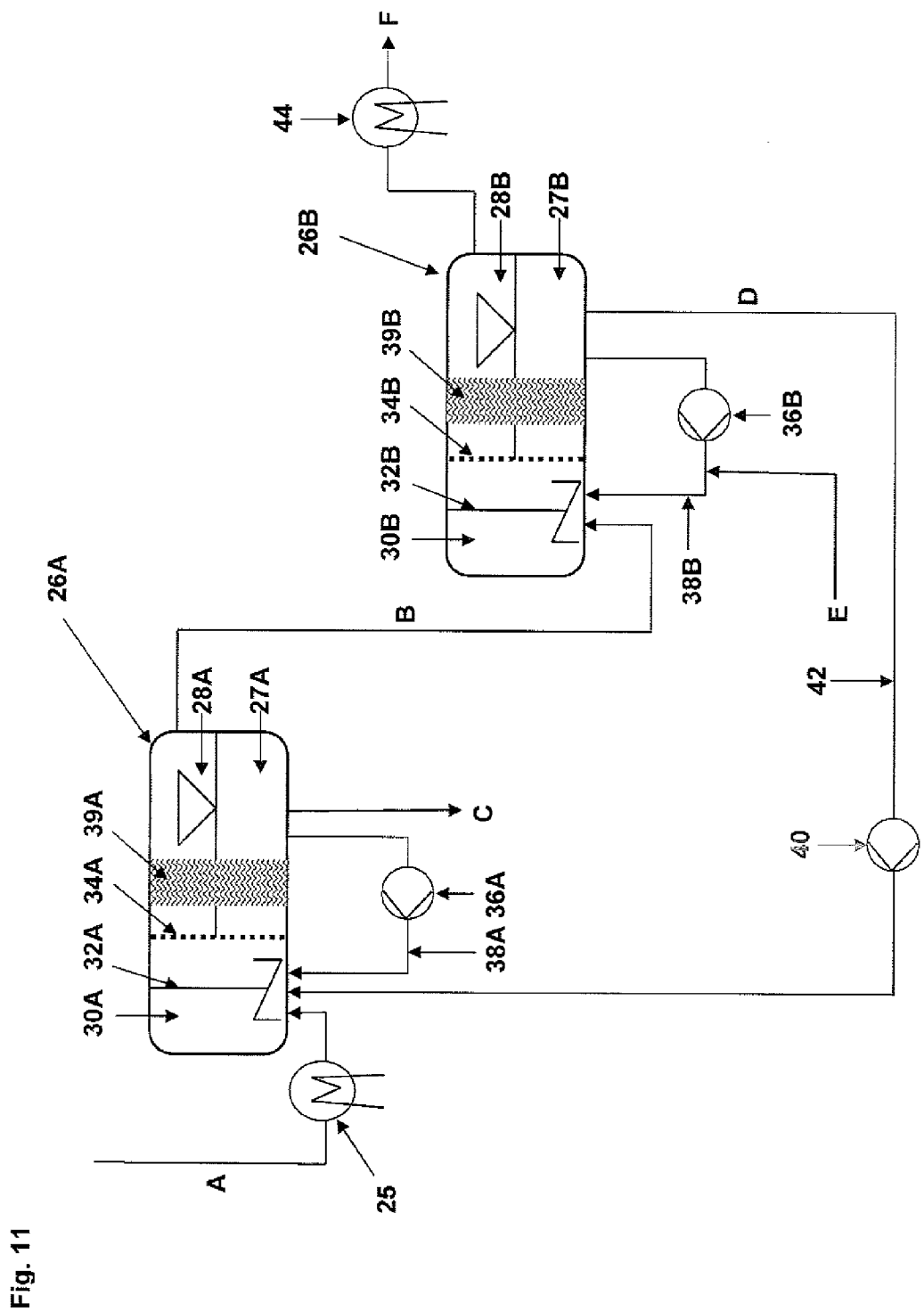
FIG. 11 shows a double-stage prewashing unit having additional heaters

A further improved and preferred embodiment having additional heaters for fluid A and fluid F is shown in FIG. 11 which is apart form the heaters identical to FIG. 10. Fluid A is heated before entering the separating apparatus by heater 25, the organic phase 28 leaving the second separating apparatus 26B is heated by heater 44.

The performance of Step pre-a) is particularly advantageous for fluids F containing halobutyl rubbers, and in particular for chlorobutyl and bromobutyl rubbers, since crude halobutyl rubber solutions often contain high amounts of inorganic halides resulting from the halogenation of the polymer.

For example, a fluid A stemming from the bromination of butyl rubber typically contains inorganic bromide levels of 3,000 to 5,000 ppm calculated on the mass of bromobutyl rubber. Upon performance of step pre-a) this level can be reduced to less than 500 ppm, preferably to less than 300 ppm and even more preferably to less than 100 ppm.

For example, a fluid A stemming from the chlorination of butyl rubber typically contains inorganic chloride levels of 1,000 to 5,000 ppm calculated on the mass of chlorobutyl rubber. Upon performance of step pre-a) this level can be reduced to less than 500 ppm, preferably to less than 300 ppm and even more preferably to less than 100 ppm.

It was further found that the performance of step pre-a) allows to significantly reduce the water content of fluid F compared to fluid A, which contributes to a significantly lower energy consumption for the subsequent steps a) to c).

Figure 7:
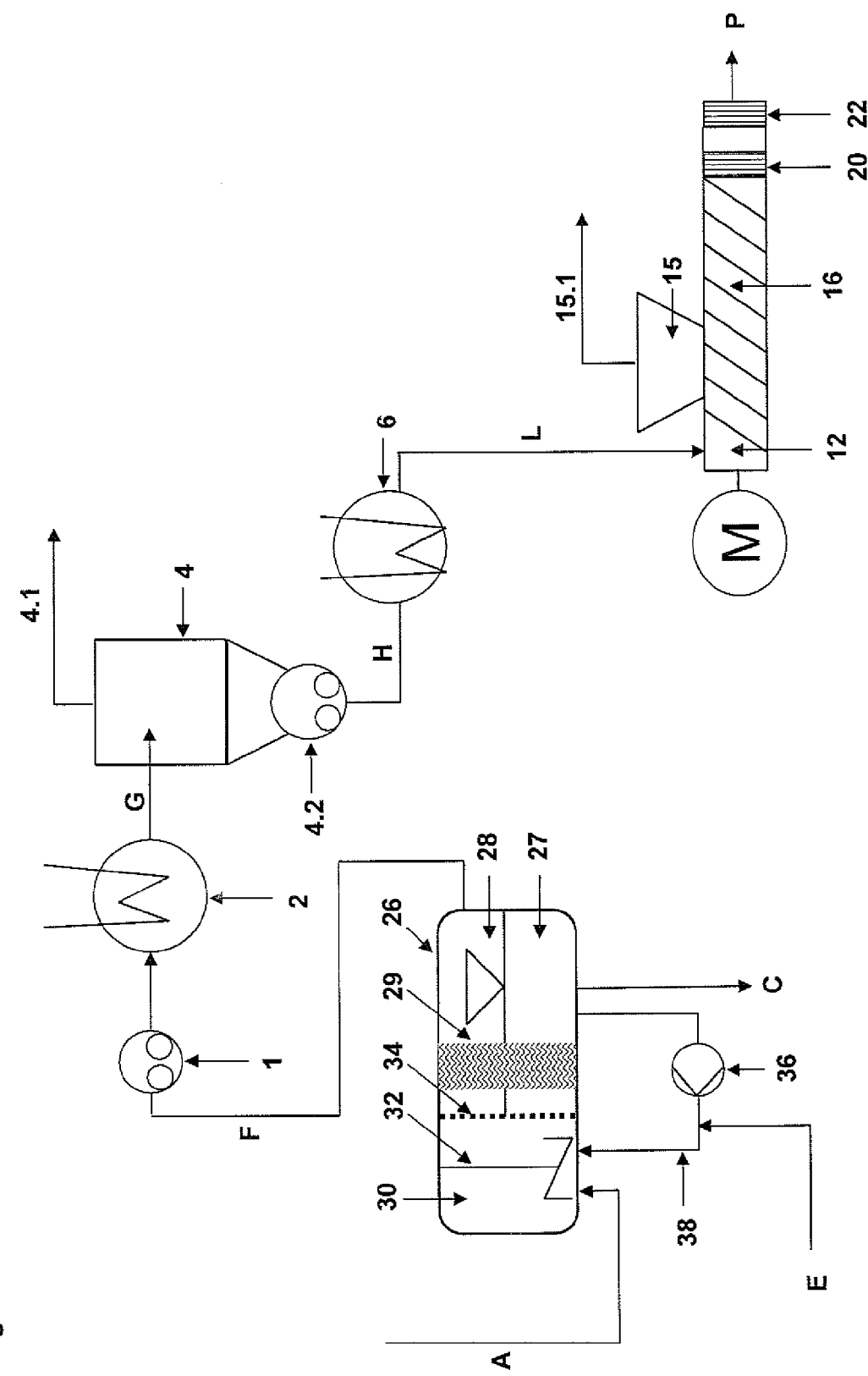
FIG. 7 shows a single-stage prewashing unit, a single-stage concentrator unit, a reheating unit and an extruder unit comprising one extruder degassing section, one accumulating section and one outlet section.

One further embodiment of the invention is shown in FIG. 7. FIG. 7 shows a basic flow chart and suitable device for the accomplishment of the process comprising the steps pre-a) and a) to c).

In step pre-a) fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed as fluid F. In step a) Fluid F is transferred via pump 1 to the heater 2, whereby heated fluid G is obtained. Heated fluid G is fed into the degassing vessel 4. The vapors emerging from the heated fluid G are separated and removed by a vacuum line 4.1. After degassing and separation a concentrated fluid H is obtained, which is removed from the degassing vessel 4 by means of a pump 4.2.

In step b), the concentrated fluid H obtained in step a) is then passed through a reheating unit 6 to obtain a reheated concentrated fluid L. In step c), the reheated concentrated fluid L obtained in step b) is passed on to a extruder unit and fed into the conveying section 16 of the extruder at the feeding point 12. The conveying section 16 is open to a vent port 15. In the conveying section 16 a part of the solvent is evaporated and separated from the reheated concentrated fluid L. The vapors are removed through the vent port 15 via vapor line 15.1. The conveying section 16 is terminated by a accumulating section 20. While passing from the conveying section 16 and the accumulating section 20 to the outlet section 22 the reheated concentrated fluid L undergoes a transition from the free-flowing reheated concentrated fluid L to the product P.

The invention is in particular advantageous in view of energy and fresh water consumption. The products obtained are free of volatile compounds.

EXAMPLES

Analytical Methods

Water content of fluids F: The sample was put into a centrifuge and spun for 5 min at 4000 rpm at room temperature. The water was then collected at the bottom of the vial and weighed.

Total volatiles concentration: A rubber sample was cut into small pieces of 2×2 mm size. Roughly 30 g of rubber pieces were put in an alumina crucible. The weight of the crucible and the rubber was determined. The crucible including the rubber sample was then placed in a vacuum oven at a vacuum level of 130 hPa for 60 min at a temperature of 105° C. After drying, the crucible was placed in an exsiccator and let cool down for 30 min. The crucible was then weighed again. The loss in weight was determined.

Residual solvent concentration in product P: The residual solvent concentration in the product was determined by headspace gas chromatography. A weighed portion (0.5+−0.005 g) of sample was placed in a headspace vial, and a measured amount of solvent (1,2 dichlorobenzene, ODCB) was added. The vial was sealed and shaken until the rubber was dissolved. The vial was heated until the volatile organic compounds were distributed at equilibrium between the sample and the gas phase in the vial (headspace). An aliquot of the headspace gas was injected into a stream of carrier gas, which carries the sample along a chromatographic column. Standards of known composition were used to calibrate the GC. Toluene was added to the solvent for use as an Internal Standard.

Residual water concentration in product P: The total volatiles concentration is the sum of water, solvents and monomers. As the monomer concentration is usually less then 0.0005 wt %, the water content can be determined by subtracting the solvent concentration from the total volatiles concentration.

Solvent concentration in fluids: The concentration of solvents in fluids were measured using gas chromatography. The internal standard was isooctane. The sample was diluted with toluene and then injected into the gas chromatograph. The gas chromatography was performed on a HP 6890 chromatograph, with following specifications:
   column type DB-5 of J&W, length 60 m, diameter 0.23 mm, film thickness 1.0 μm
   injector temp.: 250° C.
   detector temp.: 350° C.
   carrier gas: Helium
   column pressure: 96 kPa
   detector: FID Viscosity of fluids: The viscosity was measured in a rotational rheometer of cone-plate type. All given viscosities refer to the extrapolated zero shear viscosity.

Examples 1 to 7

Pre-washing

General Remarks

A crude bromobutyl rubber solution, hereinafter denoted as fluid (A), was taken from a commercial bromobutyl rubber production plant. Fluid (A) contained two phases: an aqueous phase (56 wt %) and an organic phase (44 wt %). The overall ratio of bromobutyl rubber with respect to hexanes in the organic phase alone was constant throughout the examples, being 22 wt % bromobutyl rubber and about 78 wt % hexanes. The bromobutyl rubber, contained in fluid (A) had the following properties, once finished and dried: Mooney (ML 1+8, 125° C.) of 32±4, bound bromine content 1.8±0.2 wt %.

Fluid (A) further comprised certain additives, the concentration being given as mass fraction with respect to the rubber mass (phr=parts per hundred parts of rubber):
ESBO: 1 to 1.6 phr, calcium stearate 1.3 to 1.7 phr, Irganox 0.03 to 0.1 phr The aqueous phase had a typical pH-value of 9.5. In addition to the additives, fluid (A) comprised inorganic components like bromides, chlorides, calcium, sodium, aluminum and small amounts of other inorganic components.

The experiments in examples 1 to 7 were carried out using a glass vessel having a volume of 1 l. Experiments were performed batchwise. The vessel was equipped with a stirrer.

The water content in the organic phase was determined as described above.

Example 1

A sample of fluid (A) was placed in the stirred vessel and stirred for 10 min at 58° C. Then the stirrer was stopped and the sample was left for settling. After 30 min the organic phase was separated from the aqueous phase and the residual water content measured in the centrifuge. The residual amount of water was 35 vol %.

Example 2

160 ml of fluid (A) were placed in the vessel and 240 ml of water were added. The mixture was stirred for 10 min at 58° C. Then the stirrer was stopped and the mixture was left for settling. After 30 min the organic phase was separated from the aqueous phase and the residual water content measured in the centrifuge. The residual amount of water in the organic phase was 10.0 vol %.

Example 3

160 ml of fluid (A) were placed in the vessel and 240 ml of water were added. The mixture was stirred for 10 min at 90° C. Then the stirrer was stopped and the mixture was left for settling. After 30 min the organic phase was separated from the aqueous phase and the residual water content measured in the centrifuge. The residual amount of water in the organic phase was 6.5 vol %.

Example 4

160 ml of fluid (A) were placed in the vessel and 240 ml of water were added. The mixture was stirred for 10 min at 105° C. Then the stirrer was stopped and the mixture was left for settling. After 30 min the organic phase was separated from the aqueous phase and the residual water content measured in the centrifuge. The residual amount of water in the organic phase was 1.5 vol %.

Example 5

A sample of fluid (A) was taken and left settling. The aqueous phase and the organic phase were analyzed. The aqueous phase contained 4940 mg/l of inorganic bromides. The organic phase contained 20 wt % bromobutyl rubber, 68 wt % hexane and 12 wt % water. The total inorganic bromine concentration in the organic phase was 0.15 wt % (1500 ppm).

Example 6

100 ml of the organic phase obtained in example 5 was placed in the stirred vessel described above. 40 ml of water added. The resulting mixture was stirred for 15 min at ambient temperature and then left settling for 30 min. The resulting aqueous phase contained 2280 mg/l of inorganic bromides. The organic phase contained a total of 0.04 wt % (400 ppm) of inorganic bromides.

Example 7

100 ml of the organic phase obtained in example 5 was placed in the stirred vessel described above. 80 ml of water added. The resulting mixture was stirred for 15 min at ambient temperature and then left settling for 30 min. The resulting aqueous phase contained 1100 mg/l of inorganic bromides. The organic phase contained a total of 0.025 wt % (250 ppm) of inorganic bromides.

Examples 8 to 27

Concentration and Direct Evaporation

The fluid (F) containing butyl rubber used as a feedstock for examples 7 to 28 was obtained from two different sources:
Preparation of fluid F1
A crude butyl rubber solution was taken from a commercial production plant, allowed to settle several hours and the organic phase separated from the bulk aqueous phase. The organic phase was then used to perform the experiments as fluid (F1). Fluid (F1) contained 20 wt % rubber, 70 wt % hexanes and 10 wt % water calculated on 100 wt % of these three components. The concentration of additives with respect to the bromobutyl rubber fraction was:
ESBO: 1 to 1.6 phr, Calcium stearate: 1.3 to 1.7 phr and Irganox: 0.03 to 0.1 phr
The bromobutyl rubber, dissolved in the fluid (F1), had the following properties, once finished and dried: Mooney (ML 1+8, 125° C.) of 28 to 36, Bound bromine content of 1.6 to 2.0 wt %.

The viscosity of Fluid F1 at 60° C. was 1,760 mPa*s
Preparation of fluid F2
Commercially available bromobutyl rubber with a Mooney (ML 1+8, 125° C.) of 28 to 36, a bromine content of 1.6 to 2.0 wt % and an organic volatile concentration of <0.7 wt % was dissolved in technical hexane whereby a fluid (F2) was obtained containing 20 wt % rubber, 79 wt % hexanes and 1 wt % water calculated on 100 wt % of these three components The concentration of additives with respect to the bromobutyl rubber fraction was:
ESBO: 1 to 1.6 phr, Calcium stearate 1.3 to 1.7phr and Irganox: 0.03 to 0.1 phr

Examples 8 to 12

Concentration

The Concentrator Unit
The concentrator unit used for the examples was similar to the one shown in FIG. 1. A piston pump was used to pump the fluid F1, which was prepared as described above, to heater (2). The heater (2) was a single tube-in-tube type heat exchanger. The internal pipe was equipped with a static mixer of Kenics type, the diameter of the internal pipe was 15 mm. The tube was heated by a tube shaped shell. The heating medium was heating oil (Marlotherm). A pressure relief valve (3) was installed prior to the degassing vessel (4), the pressure upstream of the valve was controlled automatically to a set point value. This set point was chosen so that boiling in the heated fluid (G1) was prevented. The heated fluid (G) was introduced into the degassing vessel (4) from the top. The conical outlet of the degassing vessel (4) was equipped with a pump (4.2), which was a combination of an extruder type pump and a gear pump. This combination had the advantage of being able to handle high viscosities and to build up high pressures. Samples were taken from the concentrated fluid (H) to investigate the concentration and viscosity after the concentration stage.

Example 8

The heating medium of the heater 2 was set to 125° C., the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 71 wt % and a viscosity of 4,840 mPa*s measured at 60° C.

Example 9

The feedstock, fluid F1, and the concentration unit were the same as in example 8. The heating medium of the heater 2 was set to 155° C., the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 53 wt % and a viscosity of 65,000 mPa*s measured at 60° C.

Example 10

The feedstock, fluid F1, and the concentration unit were the same as in example 8. The heating medium of the heater 2 was set to 170° C., the pressure in the separating vessel 4 was atmospheric (1013 hPa). The concentrated fluid H in the bottom of the separating vessel 4 was a free flowing foamy liquid, as observed through a sight glass and could be conveyed from the separating vessel without plugging or product buildup using the extraction pump 4.2 as described above. The concentrated fluid H had a hexane concentration of 42 wt % and a viscosity of 317,700 mPa*s measured at 60° C.

Example 11

The feedstock, fluid F1, and the concentration unit were the same as in example 8. The heating medium of the heater 2 was set to 170° C., the pressure in the separating vessel 4 was 500 hPa. The concentrated fluid H in the bottom of the separating vessel 4 was a free flowing foamy liquid, as observed through a sight glass and could be conveyed from the separating vessel using the extraction pump 4.2 as described above. Only little product buildup was observed in the conical outlet section of the separating vessel 4. The concentrated fluid H had a hexane concentration of 20 wt % and a viscosity of 7,600,000 mPa*s measured at 60° C.

Example 12

The feedstock, fluid F1, and the concentration unit were the same as in example 8. The heating medium of the heater 2 was set to 170° C., the pressure in the separating vessel 4 was 230 hPa. The concentrated fluid H in the bottom of the separating vessel 4 was a free flowing foamy liquid, as observed through a sight glass and could be conveyed from the separating vessel using the extraction pump 4.2 as described above. Some product buildup was observed in the conical outlet section of the separating vessel 4. The concentrated fluid H had a hexane concentration of 15 wt % and a viscosity of 15,600,000 mPa*s measured at 60° C.

The results of examples 8 to 12 showing the performance of the concentration stage are summarized in table 1.

TABLE 1

| Example | T [° C.] at heater 2* | P [hPa] in degassing vessel 4 | Hexane content [wt %] of fluid H* | Viscosity [mPa*s] at 60° C. of fluid H |
|---|---|---|---|---|
| 8 | 125° C. | 1013 | 71% | 4,840 |
| 9 | 155° C. | 1013 | 53% | 65,000 |
| 10 | 170° C. | 1013 | 42% | 317,700 |
| 11 | 170° C. | 500 | 20% | 7,600,000 |
| 12 | 170° C. | 230 | 15% | 15,600,000 |

*temperature set for the heating medium

Examples 13 to 19

Concentration and Extrusion

The device

The device used for the examples was similar to the one shown in FIG. 5. A piston pump was used to pump the fluid (F) to heater (2). The heater (2) was a single tube-in-tube type heat exchanger. The internal pipe was equipped with a static mixer of Kenics type, the diameter of the internal pipe was 15 mm. The tube was heated by a tube shaped shell. The heating medium was heating oil (Marlotherm). A pressure relief valve (3) was installed prior to the degassing vessel (4), the pressure upstream of the valve was controlled automatically to a set point value. This set point was chosen so that boiling in the heated fluid (G) was prevented. The heated fluid (G) was introduced into the degassing vessel (4) from the top. The conical outlet of the degassing vessel (4) was equipped with a pump (4.2), which was a combination of an extruder type pump and a gear pump. In step b), the concentrated fluid H obtained in step a) was then passed through a reheating unit (6) which was a single tube-in-tube type heat exchanger. The internal pipe diameter was 20 mm, the internal pipe was equipped with a static mixer of type SMX. Heating was accomplished by a tube shell using a heating oil (Marlotherm) as heating medium.

In step c) the reheated concentrated fluid L was fed into the extruder unit. The extruder of the extruder unit was a co-rotating twin screw extruder with a screw diameter of 32 mm and a screw length of 1260 mm. The extruder unit further comprised a nozzle as a pressure control device (7, see FIG. 7) upstream the feeding point (12) of the extruder, three extruder degassing sections, whereby the feeding point (12) was located at the first extruder degassing section, whereby the first extruder degassing section comprised a conveying section (16A), a rear vent port (13) connected to a vapor line (13.1) in upstream direction and whereby the extruder unit further comprised two downstream extruder degassing sections each comprising a conveying section 16B and 16C), a vent port (15A and 15B), whereby the vent ports (15A and 15B) were each connected to a vapour line (15.1A and 15.1B) and whereby each of the conveying sections (16A, 16B and 16C) was terminated by a accumulating section (18A, 18B and 20) and whereby the extruder unit further comprised an outlet section (22).

Each of the sections, in particular the conveying sections could be independently heated through the barrel of the extruder in order to control the temperature of the rubber anywhere in the extruder.

The rear vent port (13) was connected to a condenser via a first vapor line (13.1). The condenser was a plate type heat exchanger and further connected to a liquid ring vacuum pump. The other vapor lines (15.1A and 15.1B) were connected to a condensing system comprising a screw type dry running vacuum pump. The first accumulating section (18A) was made of kneading blocks, the second accumulating section (18B) was made of kneading blocks and a back conveying element. Both accumulating sections (18A and 18B) were designed to allow the injection of a stripping agent.

A sight glass was installed in the vent port (15.1B) to allow the observation of the conveying behavior and of the product properties in the conveying section (16C).

The kneading zone (20) and outlet section (22) were combined into one functional section. The accumulating section zone was composed of a die plate and a nozzle forming a strand of rubber which was formed into rubber crumbs at the outlet section.

Example 13

Fluid F2 as described above was used as feedstock (fluid F). The throughput of fluid F2 was set to 20 kg/h, which corresponds to 4.4 kg/h of the final bromobutyl rubber product. The heating temperature of the heater (2) was set to 154° C., the pressure in the separating vessel (4) to 626 hPa. The temperature of the heating medium of the reheating unit (6) was set to 153° C., the pressure in the rear vent port (13) was 626 hPa. The barrel temperature of the extruder was 81° C. The pressure in the second and third vent port (15A and 15B) was lowered to 6 hPa. Nitrogen was fed into the accumulating section (18B) as a stripping agent at a rate of 0.85 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.

Total volatiles: 0.89 wt %
Hexane:. 0.65 wt %
Water: 0.24 wt %.

Example 14

Fluid F2 as described above was used as feedstock (fluid F). The throughput of fluid F2 was set to 5 kg/h, which corresponds to 1.1 kg/h of the final bromobutyl rubber product. The heating temperature of the heater (2) was set to 157° C., the pressure in the separating vessel (4) to 633 hPa. The temperature of the heating medium of the reheating unit (6) was set to 156° C., the pressure in the rear vent port (13) was 633 hPa. The barrel temperature of the extruder was 81° C. The pressure in the second and third vent port (15A and 15B) was lowered to 6 hPa. Nitrogen was fed into the accumulating section (18B) as a stripping agent at a rate of 3.41 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.

Total volatiles: 0.72 wt %
Hexane:. 0.56 wt %
Water: 0.16 wt %.

Example 15

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 156° C., the pressure in the separating vessel (4) to 318 hPa. The temperature of the heating medium of the reheating unit (6) was set to 156° C., the pressure in the rear vent port (13) was 318 hPa. The barrel temperature of the extruder was 81° C. The pressure in the second and third vent port (15A and 15B) was lowered to 12 hPa. Nitrogen was fed into the accumulating section (18B) as a stripping agent at a rate of 1.70 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.

Total volatiles: 0.80 wt %
Hexane:. 0.40 wt %
Water: 0.40 wt %.

Example 16

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 155° C., the pressure in the separating vessel (4) to 475 hPa. The temperature of the heating medium of the reheating unit (6) was set to 156° C., the pressure in the rear vent port (13) was 475 hPa. The barrel temperature of the extruder was 100° C. The pressure in the second and third vent port (15A and 15B) was lowered to 11 hPa. No stripping agent was fed into the accumulating section (18B). Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.

Total volatiles: 0.97 wt %
Hexane:. 0.58 wt %
Water: 0.39 wt %.

Example 17

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 155° C., the pressure in the separating vessel (4) to 475 hPa. The temperature of the heating medium of the reheating unit (6) was set to 156° C., the pressure in the rear vent port (13) was 475 hPa. The barrel temperature of the extruder was 100° C. The pressure in the second and third vent port (15A and 15B) was lowered to 11 hPa. Water was fed into the accumulating section (18B) as a stripping agent at a rate of 4.09 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.

Total volatiles: 0.45 wt %
Hexane:. 0.31 wt %
Water: 0.14 wt %.

Example 18

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 155° C., the pressure in the separating vessel (4) to 475 hPa. The temperature of the heating medium of the reheating unit (6) was set to 156° C., the pressure in the rear vent port (13) was 475 hPa. The barrel temperature of the extruder was 130° C. The pressure in the second and third vent port (15A and 15B) was lowered to 11 hPa. Water was fed into the accumulating section (18B) as a stripping agent at a rate of 4.09 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.
Total volatiles: 0.22 wt %
Hexane:. 0.13 wt %
Water: 0.09 wt %.

Example 19

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 155° C., the pressure in the separating vessel (4) to 475 hPa. The temperature of the heating medium of the reheating unit (6) was set to 156° C., the pressure in the rear vent port (13) was 475 hPa. The barrel temperature of the extruder was 160° C. The pressure in the second and third vent port (15A and 15B) was lowered to 11 hPa. Water was fed into the accumulating section (18B) as a stripping agent at a rate of 4.09 wt % with respect to mass of the final bromobutyl rubber product. Through the sight glass in the separating vessel (4) it was observed, that the concentrated fluid H was still a free flowing fluid. Through the sight glass at the last vent port of the extruder (15B) it could be observed that the rubber had already changed to a crumbly state in the extruder. The crumbs appeared white and were permanently drawn in and kneaded by the action of the screw shafts. At the outlet section (22) a strand of rubber was produced, which was then cut into crumbs or chunks of rubber. The final bromobutyl rubber product (P) collected at the outlet section was analyzed to determine the hexane and total volatiles concentration.
Total volatiles: 0.09 wt %
Hexane:. 0.04 wt %
Water: 0.05 wt %.

The results of examples 13 to 19 are summarized in tables 2a), b) and c).

TABLE 2a

Concentration Unit
Process conditions in the Concentration and Reheating Units

| Example | Throughput [kg/h] of fluid F2 | Throughput* [kg/h] of Product P | T [° C.] at heater 2* | P [hPa] in degassing vessel 4 | T [° C.] at reheating unit 6* |
|---|---|---|---|---|---|
| 13 | 20 | 4.4 | 154 | 626 | 153 |
| 14 | 5 | 1.1 | 157 | 633 | 156 |
| 15 | 10 | 1.1 | 156 | 318 | 156 |
| 16 | 10 | 1.1 | 155 | 475 | 155 |
| 17 | 10 | 1.1 | 155 | 475 | 155 |
| 18 | 10 | 1.1 | 155 | 475 | 155 |
| 19 | 10 | 1.1 | 155 | 475 | 155 |

*temperature set for the heating medium

TABLE 2b

Extruder Unit
Process conditions in the Extruder Unit

| Example | P [hPa] at vent port 13 | P [hPa] at vent port 15A | P [hPa] at vent port 15B | Stripping agent at section 18B | Amount [wt %]* |
|---|---|---|---|---|---|
| 13 | 626 | 6 | 6 | nitrogen | 0.85 |
| 14 | 633 | 6 | 6 | nitrogen | 3.41 |
| 15 | 318 | 12 | 12 | nitrogen | 1.70 |
| 16 | 475 | 11 | 11 | none | — |
| 17 | 475 | 11 | 11 | water | 4.09 |
| 18 | 475 | 11 | 11 | water | 4.09 |
| 19 | 475 | 11 | 11 | water | 4.09 |

*wt % with respect to bromobutyl rubber product

TABLE 2c

Results
Contents of volatiles in the final product

| Example | Hexane [wt %] | Water [wt %]* | Total Volatiles [wt %] |
|---|---|---|---|
| 13 | 0.65 | 0.24 | 0.89 |
| 14 | 0.56 | 0.16 | 0.72 |
| 15 | 0.40 | 0.40 | 0.80 |
| 16 | 0.58 | 0.39 | 0.97 |
| 17 | 0.31 | 0.14 | 0.45 |
| 18 | 0.13 | 0.09 | 0.22 |
| 19 | 0.04 | 0.05 | 0.09 |

*Difference of Total Volatiles and Hexane content

Examples 20 to 23

Concentration and Extrusion

The Device
The device used for the examples was similar to the one shown in FIG. 6 and identical to the one described for examples 13 to 19, except that:
  The extruder unit comprised a fourth degassing zone, comprising a fourth conveying section (16D) and a fourth vent port (15C) equipped with a vapor line (15.1C) which was connected to a previous vapor line (15.1B).
  The sight glass to observe the product behavior was part of the vent port (15C) instead of the vent port (15B).
  The third accumulating section (18C) was made of kneading elements and a back conveying element similar to the second accumulating section (18B) and was also designed to allow the injection of a stripping agent.
  The final kneading zone (20) comprised kneading and back conveying elements The outlet section (22) just comprised screw conveying elements and an open outlet.

General Procedure

Fluid F2 as described above was used as feedstock (fluid F). The throughput of fluid F2 was set to 10 kg/h, which corresponds to 2.2 kg/h of the final bromobutyl rubber product. The heating temperature of the heater (2) was set to 160° C., the pressure in the separating vessel (4) to 450 hPa. The temperature of the heating medium of the reheating unit (6) was set to 160° C., the pressure in the rear vent port (13) was 450 hPa. The barrel temperature of the extruder was 130° C. The pressure in the second, third and fourth vent port (15A, 15B and 15C) was lowered to 6 hPa.

The types and amounts of stripping agents injected at the accumulating sections (18B and 18C) were varied as can be seen in table 3b). Through the sight glass in the separating vessel (4) it was observed for each experiment, that the concentrated fluid H was still a free flowing fluid. Through the sight glass at the last vent port of the extruder (15C) it could be observed that the rubber had already changed to a crumbly state in the extruder. The crumbs appeared white and were permanently drawn in and kneaded by the action of the screw shafts. At the outlet section (22) rubber crumbs of a size of roughly 2-6 mm were formed. The final bromobutyl rubber product (P) collected at the outlet section was analyzed to determine the hexane and total volatiles concentration.

The process conditions and results are given in tables 3a), b) and c).

TABLE 3a

Concentration Unit
Process conditions in the Concentration and Reheating Units

| Example | Throughput [kg/h] of fluid F2 | Throughput* [kg/h] of Product P | T [° C.] at heater 2* | P [hPa] in degassing vessel 4 | T [° C.] at reheating unit 6* |
|---|---|---|---|---|---|
| 20 to 23 | 10 | 1.1 | 160 | 450 | 160 |

*temperature set for the heating medium

TABLE 3b

Extruder Unit
Process conditions in the Extruder Unit*

| Example | P [hPa] at vent port 13 | P [hPa] at vent ports 15A, 15B and 15C | Stripping agent at section 18B | Amount [wt %]** | Stripping agent at section 18B | Amount [wt %]** |
|---|---|---|---|---|---|---|
| 20 | 450 | 6 | none | — | none | — |
| 21 | 450 | 6 | nitrogen | 1.70 | none | — |
| 22 | 450 | 6 | none | — | water | 2.73 |
| 23 | 450 | 6 | nitrogen | 1.70 | water | 2.73 |

*The barrel temperature of the extruder was set to 130° C. in all examples
**wt % with respect to bromobutyl rubber product TABLE 3c Results
Contents of volatiles in the final product

| Example | Hexane [wt %] | Water [wt %] | Total Volatiles [wt %] |
|---|---|---|---|
| 20 | 0.03 | 0.08 | 0.11 |
| 21 | 0.02 | 0.08 | 0.10 |
| 22 | 0.03 | 0.12 | 0.15 |
| 23 | 0.02 | 0.07 | 0.09 |

Examples 24 to 27

Concentration and Extrusion

The Device

The device used for the examples was identical to the one described for examples 20 to 23

Example 24

Fluid F1 as described above was used as feedstock (fluid F). The throughput of fluid F1 was set to 20 kg/h, which corresponds to 4.4 kg/h of the final bromobutyl rubber product. The heating temperature of the heater (2) was set to 139° C., the pressure in the separating vessel (4) to 756 hPa. The temperature of the heating medium of the reheating unit (6) was set to 153° C., the pressure in the rear vent port (13) was 147 hPa. The barrel temperature of the extruder was 130° C. The pressure in the second vent port (15A) was lowered to 270 hPa, the pressure in the third and fourth vent port (15B and 15C) was lowered to 40 hPa. Water was fed into each of the accumulating sections (18B and 18C) as a stripping agent at a rate of 1.36 wt % with respect to the mass of the final bromobutyl rubber product. Through the sight glass in the separating vessel (4) it was observed, that the concentrated fluid H was still a free flowing fluid. Through the sight glass at the last vent port of the extruder (15C) it could be observed that the rubber had already changed to a crumbly state in the extruder. The crumbs appeared white and were permanently drawn in and kneaded by the action of the screw shafts. At the outlet section (22) rubber crumbs of a size of roughly 2-6 mm were formed. The final bromobutyl rubber product (P) collected at the outlet section was analyzed to determine the hexane and total volatiles concentration.

Total volatiles: 0.200 wt %

Hexane:. 0.080 wt %

Water: 0.120 wt %.

Example 25

Fluid F1 as described above was used as feedstock (fluid F). The throughput of fluid F1 was set to 20 kg/h, which corresponds to 4.4 kg/h of the final bromobutyl rubber product. The heating temperature of the heater (2) was set to 157° C., the pressure in the separating vessel (4) to 869 hPa. The temperature of the heating medium of the reheating unit (6) was set to 147° C., the pressure in the rear vent port (13) was 869 hPa. The barrel temperature of the extruder was 130° C. The pressure in the second vent port (15A) was lowered to 270 hPa, the pressure in the third and fourth vent port (15B and 15C) was lowered to 40 hPa. Water was fed into each of the accumulating sections (18B and 18C) as a stripping agent at a rate of 2.73 wt % with respect to the mass of the final bromobutyl rubber product. Through the sight glass in the separating vessel (4) it was observed, that the concentrated fluid H was still a free flowing fluid. Through the sight glass at the last vent port of the extruder (15C) it could be observed that the rubber had already changed to a crumbly state in the extruder. The crumbs appeared white and were permanently drawn in and kneaded by the action of the screw shafts. At the outlet section (22) rubber crumbs of a size of roughly 2-6 mm were formed. The final bromobutyl rubber product (P) collected at the outlet section was analyzed to determine the hexane and total volatiles concentration.
Total volatiles: 0.260 wt %
Hexane:. 0.092 wt %
Water: 0.168 wt %.

Example 26

Fluid F1 as described above was used as feedstock (fluid F). The throughput of fluid F1 was set to 20 kg/h, which corresponds to 4.4 kg/h of the final bromobutyl rubber product. The heating temperature of the heater (2) was set to 157° C., the pressure in the separating vessel (4) to 796 hPa. The temperature of the heating medium of the reheating unit (6) was set to 147° C., the pressure in the rear vent port (13) was 796 hPa. The barrel temperature of the extruder was 130° C. The pressure in the second vent port (15A) was lowered to 140 hPa, the pressure in the third and fourth vent port (15B and 15C) was lowered to 40 hPa. Water was fed into each of the accumulating sections (18B and 18C) as a stripping agent at a rate of 1.29 wt % with respect to the mass of the final bromobutyl rubber product. Through the sight glass in the separating vessel (4) it was observed, that the concentrated fluid H was still a free flowing fluid. Through the sight glass at the last vent port of the extruder (15C) it could be observed that the rubber had already changed to a crumbly state in the extruder. The crumbs appeared white and were permanently drawn in and kneaded by the action of the screw shafts. At the outlet section (22) rubber crumbs of a size of roughly 2-6 mm were formed. The final bromobutyl rubber product (P) collected at the outlet section was analyzed to determine the hexane and total volatiles concentration.
Total volatiles: 0.180 wt %
Hexane:. 0.099 wt %
Water: 0.081 wt %.

Example 27

Fluid F1 as described above was used as feedstock (fluid F). The throughput of fluid F1 was set to 20 kg/h, which corresponds to 4.4 kg/h of the final bromobutyl rubber product. The heating temperature of the heater (2) was set to 157° C., the pressure in the separating vessel (4) to 791 hPa. The temperature of the heating medium of the reheating unit (6) was set to 147° C., the pressure in the rear vent port (13) was 791 hPa. The barrel temperature of the extruder was 130° C. The pressure in the second vent port (15A) was lowered to 140 hPa, the pressure in the third and fourth vent port (15B and 15C) was lowered to 40 hPa. Nitrogen was fed into the first accumulating section (18B) at a rate of 0.89 wt % with respect to the mass of the final bromobutyl rubber product and water into the second accumulating section (18C) at a rate of 1.29 wt %. Through the sight glass in the separating vessel (4) it was observed, that the concentrated fluid H was still a free flowing fluid. Through the sight glass at the last vent port of the extruder (15C) it could be observed that the rubber had already changed to a crumbly state in the extruder. The crumbs appeared white and were permanently drawn in and kneaded by the action of the screw shafts. At the outlet section (22) rubber crumbs of a size of roughly 2-6 mm were formed. The final bromobutyl rubber product (P) collected at the outlet section was analyzed to determine the hexane and total volatiles concentration.
Total volatiles: 0.140 wt %
Hexane:. 0.055 wt %
Water: 0.085 wt %.

The process conditions and results are summarized in tables 4a), b) and c).

TABLE 4a

| | | Concentration Units Process conditions in the Concentration Units | | | |
|---|---|---|---|---|---|
| Example | Throughput* [kg/h] | T [° C.] at heater 2A** | P [hPa] in degassing vessel 4A | T [° C.] at heater 2B** | P [hPa] in degassing vessel 4B |
| 24 | 4.4 | 139 | 756 | 123 | 130 |
| 25 | 4.4 | 157 | 869 | 147 | 130 |
| 26 | 4.6 | 157 | 796 | 147 | 130 |
| 27 | 4.2 | 157 | 791 | 147 | 129 |

*calculated on bromobutyl rubber product leaving the extruder unit
**temperature set for the heating medium TABLE 4b

| | Extruder Unit Process conditions in the Extruder Unit* | | | | | | |
|---|---|---|---|---|---|---|---|
| Example | P [hPa] at vent port 13 | P [hPa] at vent port 15A | P [hPa] at vent port 15B | Stripping agent at section 18B | Amount [wt %]** | Stripping agent at section 18C | Amount of [wt %]** |
| 24 | 756 | 270 | 40 | water | | water | |
| 25 | 869 | 270 | 40 | water | 2.73 | water | 2.73 |

TABLE 4b-continued

Extruder Unit
Process conditions in the Extruder Unit*

| Example | P [hPa] at vent port 13 | P [hPa] at vent port 15A | P [hPa] at vent port 15B | Stripping agent at section 18B | Amount [wt %]** | Stripping agent at section 18C | Amount of [wt %]** |
|---|---|---|---|---|---|---|---|
| 26 | 796 | 140 | 40 | water | 1.29 | water | 1.29 |
| 27 | 791 | 140 | 40 | nitrogen | 0.89 | water | 1.42 |

*The barrel temperature of the extruder was set to 130° C. in all examples
**wt % with respect to rubber mass flow TABLE 4c Results
Contents of volatiles in the final product

| Example | Hexane [wt %] | Water [wt %]* | Total Volatiles [wt %] |
|---|---|---|---|
| 24 | 0.08 | 0.12 | 0.20 |
| 25 | 0.09 | 0.17 | 0.26 |
| 26 | 0.10 | 0.08 | 0.18 |
| 27 | 0.06 | 0.08 | 0.14 |

The reference numerals used hereinbefore are summarized below:
1 pump
2, 2A, 2B heater
3 pressure control device
4, 4A, 4B degassing vessel
4.1, 4.1A, 4.1B vapor line
4.2, 4.2A, 4.2B pump
6 reheating unit
7 pressure control device
12 feeding point
13 rear vent port (upstream)
13.1 vapor line
15, 15A, 15B, 15B, 15C vent port (downstream)
15.1, 15.1A, 15.1B, 15.1C vapor line
16, 16A, 16B, 16B, 16C conveying section (downstream)
18, 18A, 18B, 18B, 18C accumulating section
20 last accumulating section
22 outlet section
25 heater
26, 26A, 26B separating vessel
27, 27A, 27B aqueous phase
28, 28A, 28B organic phase
30, 30A, 30B mixing section
32, 32A, 32B mixer
34, 34A, 34B separating wall
36, 36A, 36B recirculation pump
38, 38A, 38B recirculation line
39, 39A, 39B coalescer
40 recirculation pump
42 recirculation line
44 heater
A crude fluid A
C waste water
D aqueous phase for recycling
E fresh water
F fluid F
G heated fluid H
H concentrated fluid H
J pre-concentrated fluid J
K reheated pre-concentrated fluid K
L reheated concentrated fluid L
P product

The invention claimed is:

1. A process for removing volatile compounds from a fluid comprising at least one synthetic rubber and at least one volatile compound, the process comprising:
   a) heating the fluid to a first temperature to form a heated fluid, and removing a portion of the volatile compounds from the heated fluid via vacuum in a degassing vessel at a first pressure to obtain a free-flowing concentrated fluid, wherein the first pressure and first temperature are configured to obtain a concentrated fluid comprising 10-60 wt % non-volatile polymer and 40-90 wt % volatile compounds;
   b) reheating the concentrated fluid to a second temperature to obtain a reheated free-flowing concentrated fluid; and
   c) extruding the reheated concentrated fluid in an extruder comprising at least one degassing section, and removing at least an additional portion of the volatile compounds from the reheated concentrated fluid via vacuum in the at least one degassing section at a second pressure to obtain a non-volatile polymer product having a content of volatile compounds of less than 0.5 wt % water and less than 0.75 wt % volatile organic compounds based on the total mass of the non-volatile polymer.

2. The process according to claim 1, wherein the viscosity of the reheated concentrated fluid is 500 mPa to 50,000,000 mPa.

3. The process according to claim 1, wherein the content of volatile compounds in the non-volatile polymer is less than 1 wt % based on the total mass of the non-volatile polymer.

4. The process according to claim 1, wherein the at least one synthetic rubber comprises at least one halogenated butyl rubber.

5. The process according to claim 1, wherein the fluid contains from 3 wt % to 50 wt % polymer and from 60 wt % to 97 wt % volatile compounds, wherein the total amount of polymer and volatile compounds comprise 90 to 100 wt % of the total mass of the fluid.

6. The process according to claim 1, wherein the fluid has a viscosity of 100 mPa to 25,000 mPa.

7. The process according to claim 1, wherein:
   the first temperature is 100° C. to 200° C.;
   the first pressure is 100 hPa to 4,000 hPa;
   the second temperature is 50° C. to 200° C.; and
   the second pressure is 1 hPa to 2,000 hPa.

8. The process according to claim 1, wherein:
   the process, prior to a), further comprises:
   a1) treating a crude fluid comprising one or more of a non-volatile polymer, at least one volatile organic compound, at least one hydrophilic compound, and combinations thereof, by mixing the crude fluid with water to obtain an organic phase comprising primarily non-volatile polymer and volatile organic compounds, and an aqueous phase comprising water and hydrophilic compounds, and a2) separating the aqueous phase from the organic phase, wherein the organic phase is the fluid and comprises 3-50 wt % non-volatile polymer and 60-97 wt % volatile compounds which together add up to 95 100 wt % of the fluid;

the process further comprises serially repeating step a) at least one additional time;

the first temperature is 120° C. to 175° C.;

the first pressure is 230 hPa to 1,100 hPa;

the first pressure and first temperature are configured to obtain a concentrated fluid comprising 25-60 wt % non-volatile polymer and 40-75 wt % volatile compounds;

the second temperature is 90° C. to 180° C.; and the second pressure is 5 hPa to 900 hPa and the non-volatile polymer has a content of volatile compounds of less than 0.075 wt % water and less than 0.1 wt % volatile organic compounds based on the total mass of the non-volatile polymer.

9. The process according to claim 1, wherein extruding further comprises controlling the temperature in different zones of the extruder during extruding independently of each other at different temperatures and, wherein the separate zones are independently heated, unheated, or cooled.

10. The process according to claim 1, wherein the extruding further comprises accumulating pressure to facilitate the evaporation of volatile compounds.

11. The process according to claim 10, wherein accumulating pressure is repeated during extruding.

12. The process according to claim 1, further comprising processing the non-volatile polymer product.

13. The process according to claim 1, further comprising cooling the non-volatile polymer product.

14. The process according to claim 1, wherein extruding is performed at a feed rate of 5 kilograms per hour to 25,000 kilograms per hour.

15. The process according to claim 1, wherein extruding further comprises applying a stripping agent.

16. The process according to claim 1, further comprising adding one or more additives to the fluid prior to heating, adding one or more additives to the reheated concentrated fluid during extruding, or combinations thereof.

17. The process according to claim 1, further comprising repeating step a).

18. The process according to claim 17, wherein the repeating of step a) is performed multiple times in series.

19. The process according to claim 1, further comprising regulating the pressure during the heating, the reheating, the extruding, or combinations thereof.

20. The process according to claim 1, wherein the fluid is obtained by a process of removing hydrophilic compounds from a crude fluid comprising one or more of a polymer, a volatile organic compound, a hydrophilic compound, and combinations thereof, wherein the process comprises:

a1) treating the crude fluid by mixing the crude fluid with water to obtain an organic phase comprising primarily non-volatile polymer and volatile organic compounds and an aqueous phase comprising water and hydrophilic compounds, and a2) separating the organic phase from the aqueous phase, wherein the organic phase is the fluid for step a).

21. The process according to claim 20, wherein the separating further comprising coalescing the organic phase and the aqueous phase.

22. The process according to claim 20, further comprising repeating step a1).

23. The process according to claim 22, wherein the repeating of step a1) is performed multiple times in series.

24. The process according to claim 20, wherein the separating is performed at temperatures of greater than 40° C.

* * * * *